(12) United States Patent
Saito

(10) Patent No.: US 7,725,651 B2
(45) Date of Patent: May 25, 2010

(54) STORAGE SYSTEM AND DATA MANAGEMENT METHOD

(75) Inventor: Satoshi Saito, Odawara (JP)

(73) Assignee: Hitachi, Ltd., Tokyo (JP)

( * ) Notice: Subject to any disclaimer, the term of this patent is extended or adjusted under 35 U.S.C. 154(b) by 219 days.

(21) Appl. No.: 11/701,408

(22) Filed: Feb. 2, 2007

(65) Prior Publication Data

US 2008/0133828 A1   Jun. 5, 2008

(30) Foreign Application Priority Data

Nov. 30, 2006   (JP) .............................. 2006-324147

(51) Int. Cl.
G06F 12/16 (2006.01)
G06F 13/10 (2006.01)
G06F 3/06 (2006.01)

(52) U.S. Cl. ............... 711/114; 711/162; 711/E12.103; 714/6; 714/E11.118; 714/E11.12; 714/E11.121

(58) Field of Classification Search ................. 711/111, 711/114, 162

See application file for complete search history.

(56) References Cited

U.S. PATENT DOCUMENTS

| | | | | |
|---|---|---|---|---|
| 5,263,154 A | * | 11/1993 | Eastridge et al. | 714/6 |
| 5,522,037 A | * | 5/1996 | Kitagawa et al. | 714/40 |
| 5,720,026 A | * | 2/1998 | Uemura et al. | 714/6 |
| 6,385,706 B1 | * | 5/2002 | Ofek et al. | 711/162 |
| 6,397,308 B1 | * | 5/2002 | Ofek et al. | 711/162 |
| 6,434,683 B1 | * | 8/2002 | West et al. | 711/162 |
| 2005/0086432 A1 | * | 4/2005 | Sakai | 711/114 |
| 2005/0289505 A1 | * | 12/2005 | Williams | 717/103 |

FOREIGN PATENT DOCUMENTS

JP   07-084728   9/1993

* cited by examiner

*Primary Examiner*—Reginald G Bragdon
*Assistant Examiner*—Daniel J Bernard
(74) *Attorney, Agent, or Firm*—Stites & Harbison PLLC; Juan Carlos A. Marquez, Esq.

(57) ABSTRACT

Proposed is a storage system and a data management method enabling the easy operation of the storage system and capable of alleviating the burden on a system administrator by managing the full backup and snapshot in the same storage extent. This storage system includes a creation unit for associating a part or the whole of a storage extent of the secondary volume and creating a pool volume to be supplied with a dynamic memory storage extent from the logical volume, a first storage unit for storing difference data corresponding to the primary volume as backup data in the pool volume in order to store, based on a write command of data from the host system in an arbitrary address in the primary volume, the data in the primary volume and update the primary volume, and a second storage unit for storing data that is not updated in the primary volume based on a snapshot command from the host system for acquiring a snapshot on a primary volume at a prescribed timing as difference data or a difference data group in the pool volume.

15 Claims, 24 Drawing Sheets

FIG.6

| SEQUENCE NUMBER | ADDRESS | DATA |
|---|---|---|
| 1 | 0x1234 | AAAAA |
| 2 | 0x341E | BBBBB |
| 3 | 0x3214 | CCCCC |
| 4 | 0x3F2A | DDDDD |
| 5 | 0x9F6B | EEEEE |
| 6 | 0xB98D | FFFFF |
| 7 | 0xCB8C | GGGGG |
| ⋮ | ⋮ | ⋮ |
| 35 | 0x619F | UUUUU |

| GENERATION NUMBER | SEQUENCE NUMBER |
|---|---|
| 2 | 7 |
| 3 | 35 |
| ⋮ | ⋮ |

116A / 116B → 116

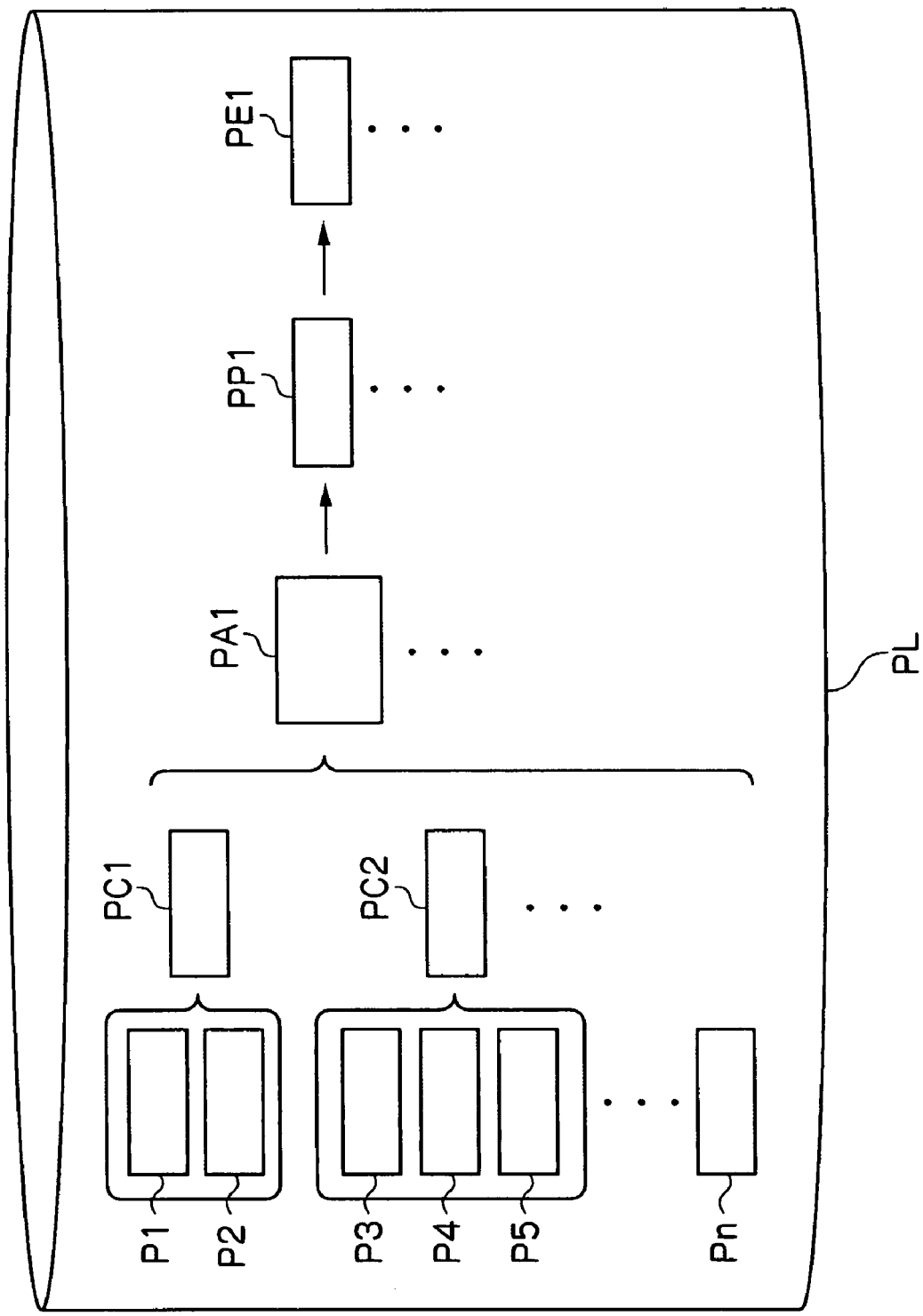

STORAGE SYSTEM AND DATA MANAGEMENT METHOD

CROSS REFERENCES

This application relates to and claims priority from Japanese Patent Application No. 2006-324147, filed on Nov. 30, 2006, the entire disclosure of which is incorporated herein by reference.

BACKGROUND

The present invention generally relates to a storage system and a data management method, and, for instance, can be suitably applied to a storage system that performs a full backup or a backup using a snapshot.

This storage system manages data using a logical volume (hereinafter referred to as a "logical volume") formed in a storage extent provided by a hard disk drive.

As a method of managing data, there is a method of periodically executing a full backup of a volume in which a user reads and writes data in a cycle of, for instance, every day or every week. As another method of managing data, there is a method of using a snapshot function loaded in a storage apparatus and periodically creating a snapshot formed from a data image of a volume at a certain point in time in a cycle of, for instance, every 12 hours or every day.

The backup data obtained by performing a full backup and the differential data obtained by using a snapshot are obtained through different methods. As a result of separately using the backup data and the differential data obtained through different methods, the volume or data stored in such volume can be restored.

Japanese Patent Laid-Open Publication No. H7-84728 discloses a data management method using technology of performing a full backup and technology of performing backup using differential data. This document proposes a data management method of deciding in a storage system of whether to perform a full backup by comparing a predetermined threshold value and the amount of differential, or perform backup using differential data.

SUMMARY

Nevertheless, in order to back up data as described above, it is necessary to separately prepare software for performing full backup and software for performing backup using differential data. Thus, for instance, during initialization or when changing the configuration of the storage system, it is necessary to configure an environment based on different types of software, respectively.

Further, since the two types of software are independent and separate software, it is not possible to combine the backup data obtained through a full backup and the differential data obtained through a snapshot so as to restore data.

Moreover, since the operation of this kind of storage system will become complicated, it is likely that a smooth operation will not be possible, and there is a problem in that the burden on the system administrator will become significant.

Thus, an object of the present invention is to propose a storage system and a data management method enabling the easy operation of the storage system and capable of alleviating the burden on the system administrator by managing the full backup and snapshot in the same storage extent.

In order to achieve the foregoing object, the present invention provides a storage system which reads data from a host system in a primary volume as a virtual volume mapped with a logical volume formed in one or more physical storage extents, and multiplexes the data in the primary volume and a secondary volume as a virtual volume pair-configured with the primary volume. This storage system comprises a creation unit for associating a part or the whole of a storage extent of the secondary volume and creating a pool volume to be supplied with a dynamic memory storage extent from the logical volume, a first storage unit for storing differential data corresponding to the primary volume as backup data in the pool volume in order to store, based on a write command of data from the host system in an arbitrary address in the primary volume, the data in the primary volume and update the primary volume, and a second storage unit for storing data that is not updated in the primary volume based on a snapshot command from the host system for acquiring a snapshot on a primary volume at a prescribed timing as differential data or a differential data group in the pool volume.

Thereby, it is possible to store the full backup and snapshot in a pool volume, which is the same memory storage extent, and manage these in the storage system.

The present invention also provides a data management method of a storage system which reads data from a host system in a primary volume as a virtual volume mapped with a logical volume formed in one or more physical storage extents, and multiplexes the data in the primary volume and a secondary volume as a virtual volume pair-configured with the primary volume. This data management method comprises a creation step for associating a part or the whole of a storage extent of the secondary volume and creating a pool volume to be supplied with a dynamic memory storage extent from the logical volume, a first storage step for storing differential data corresponding to the primary volume as backup data in the pool volume in order to store, based on a write command of data from the host system in an arbitrary address in the primary volume, the data in the primary volume and update the primary volume, and a second storage step for storing data that is not updated in the primary volume based on a snapshot command from the host system for acquiring a snapshot on a primary volume at a prescribed timing as differential data or a differential data group in the pool volume.

Thereby, it is possible to store the full backup and snapshot in a pool volume, which is the same memory storage extent, and manage these in the storage system.

Accordingly to the present invention, since the backup data and differential data can be stored and managed in the same storage extent as data having consistency in a storage system, backup can be performed at an arbitrary timing.

Further, since the easy operation of the storage system is realized, burden on the system administrator can be alleviated.

DESCRIPTION OF DRAWINGS

FIG. 6 is a conceptual diagram showing a pool area management table according to an embodiment of the present invention;

FIG. 7 is a conceptual diagram showing a generation management table according to an embodiment of the present invention;

FIG. 25 is an explanatory diagram showing an overall configuration of a storage system according to still another embodiment of the present invention.

DETAILED DESCRIPTION

An embodiment of the present invention is now explained in detail with reference to the attached drawings.

Figure 1:
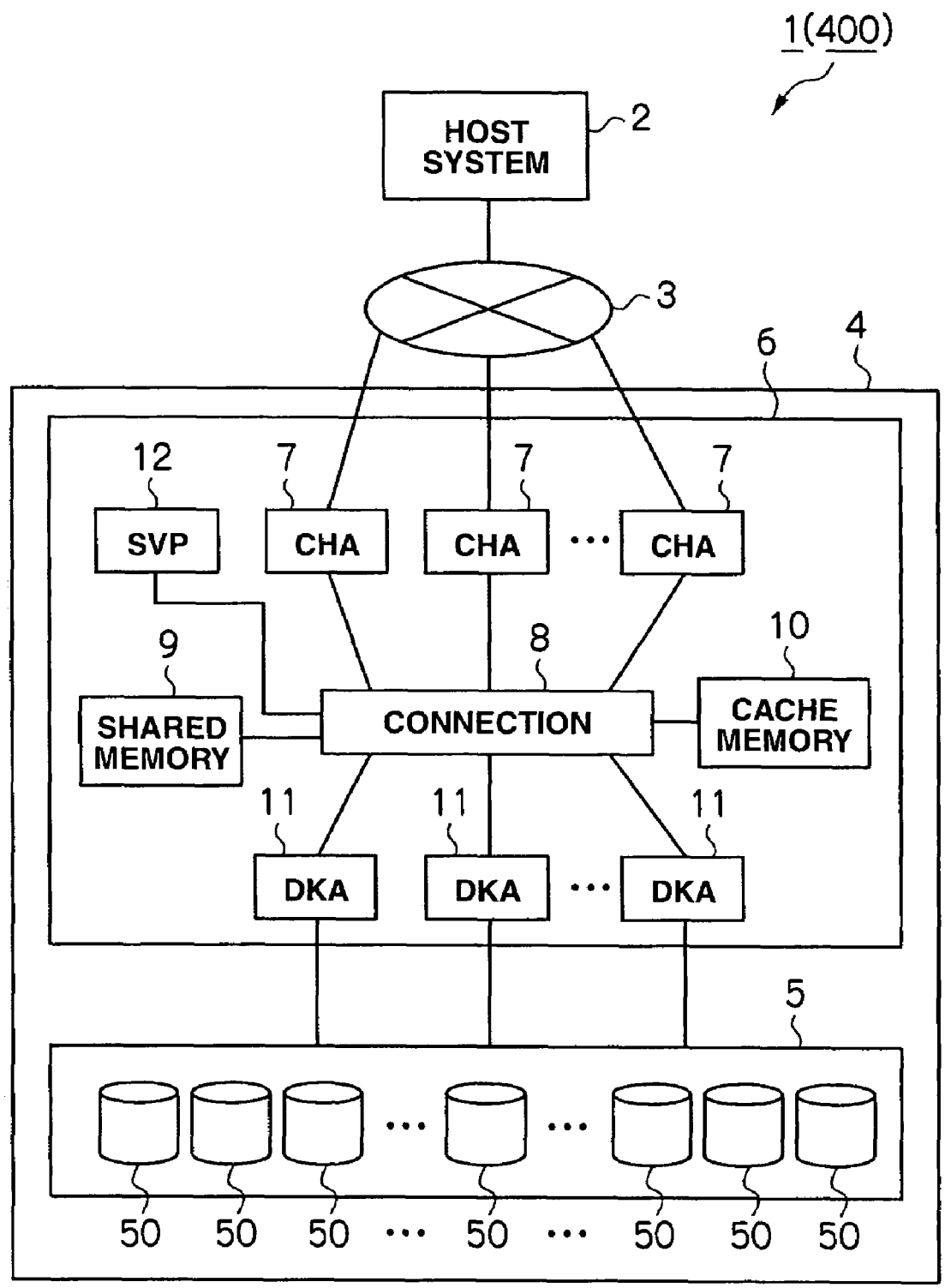
FIG. 1 is a block diagram showing an overall configuration of a storage system according to an embodiment of the present invention.

(1) First Embodiment (1-1) Configuration of Storage System in First Embodiment (1-1-1) Physical Configuration of Storage System FIG. 1 shows an overall storage system 1 according to the present embodiment. The storage system 1 is configured by a host system 2 being connected to a storage apparatus 4 via a network 3.

The host system 2 is a computer device comprising information processing resources such as a CPU (Central Processing Unit) and a memory, and, for instance, is configured from a personal computer, a workstation, a mainframe or the like. Further, the host system 2 comprises an information input device (not shown) such as a keyboard, a switch, a pointing device, a microphone or the like, and an information output device (not shown) such as a monitor display, a speaker, or the like.

The network 3, for instance, is configured from a SAN (Storage Area Network), LAN (Local Area Network), internet, public line, dedicated line or the like. Communication between the host system 2 and the storage apparatus 4 via the network 3 is conducted, for example, according to a fibre channel protocol when the network 3 is a SAN, and according to a TCP/IP (Transmission Control Protocol/Internet Protocol) protocol when the network 3 is a LAN.

The storage apparatus 4 comprises a disk drive unit configured from a plurality of hard disk drives 50, and a controller 6 for managing the plurality of hard disk drives 50 according to a RAID (Redundant Array of Independent/Inexpensive Disks) system.

The hard disk drives 50, for instance, are configured from expensive disk drives such as SCSI (Small Computer System Interface) disks, or inexpensive disk drives such as SATA (Serial AT Attachment) disks or optical disk drives.

The controller 6 comprises a plurality of channel adapters 7, a connection 8, a shared memory 9, a cache memory 10, a plurality of disk adapters 11, and a service processor 12.

Figure 2:
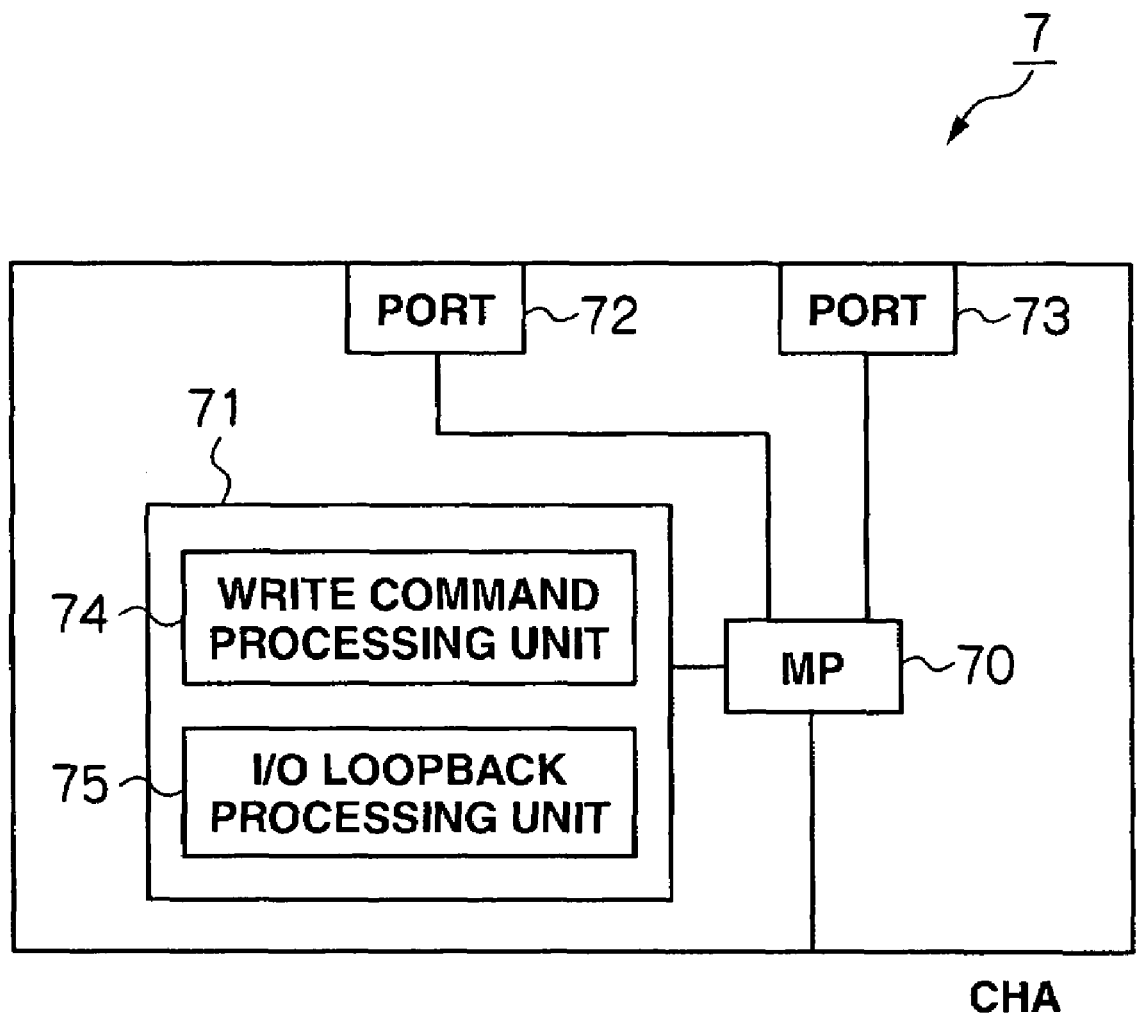
FIG. 2 is a block diagram showing a channel adapter according to an embodiment of the present invention.

The respective channel adapters 7, as shown in FIG. 2, are configured as a microcomputer system comprising a microprocessor 70, a memory 71, a communication interface and the like, and include ports 72, 73 for connecting to the network 3. The respective channel adapters 7 interpret various commands sent from the host system 2 and execute necessary processing. The ports 72, 73 of each channel adapter 7 are allocated with a network address (for instance, an IP address or WWN) for identifying the respective channel adapters 7, and the channel adapters 7 are thereby able to independently function as a NAS (Network Attached Storage). The memory 71 of each channel adapter 7 includes a write command processing unit 74 for processing write commands from the host system 2, and an I/O loop back processing unit 75 for returning a simulated I/O generated from the disk adapter 11 back to the disk adapter 11. In addition, the respective channel adapters 7 are connected to the connection via an internal bus adapter (not shown).

In addition to the foregoing channel adapters 7, the connection 8 is also connected to the shared memory 9, the cache memory 10, and the disk adapters 11. The transfer of data and commands among the channel adapters 7, the shared memory 9, the cache memory 10, and the disk adapters 11 is conducted via the connection 8. The connection 8 is configured from a switch such as an ultra-fast crossbar switch or a bus for performing data transfer with high-speed switching.

The shared memory 9 is a storage memory to be shared by the channel adapters 7 and the disk adapters 11. The shared memory 9 is primarily used for storing system configuration information and various control programs read from the system volume when the power of the storage apparatus 4 is turned on, and commands sent from the host system 2.

The cache memory 10 is also a storage memory to be shared by the channel adapters 7 and the disk adapters 11. The cache memory 10 is primarily used for temporarily storing user data to be input and output to and from the storage apparatus 4.

Figure 3:
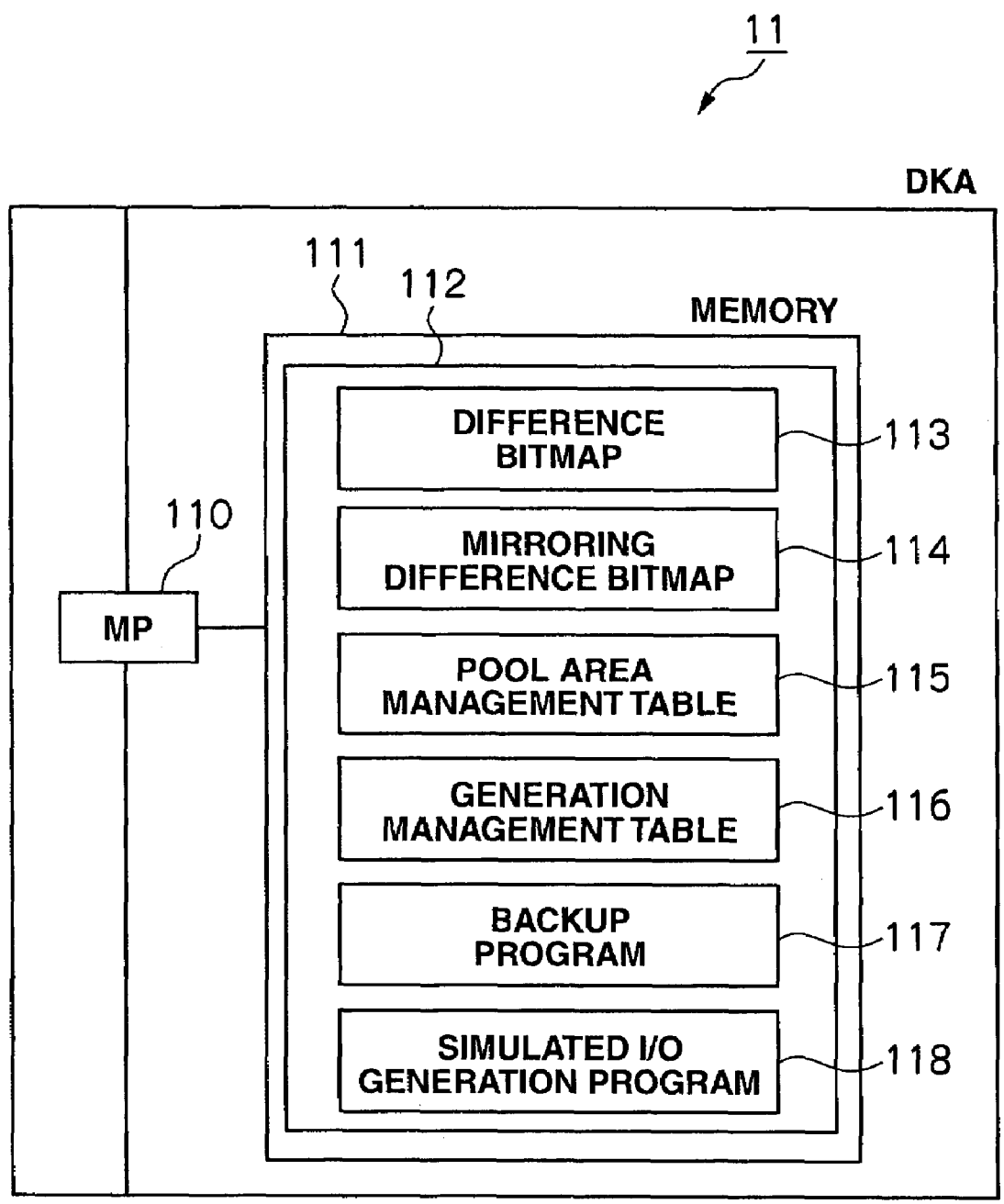
FIG. 3 is a conceptual diagram showing a logical configuration of a storage system according to an embodiment of the present invention.

The respective disk adapters 11, as shown in FIG. 3, are configured as a microcomputer system comprising a microprocessor 110, a memory 111 and the like, and functions as an interface for controlling the protocol during communication with the disk drive unit 5. The disk adapters 11 are connected to the corresponding disk drive unit 5 via, for example, a fibre channel cable, and sends and receives data to and from the disk drive unit 5 according to the fibre channel protocol.

The service processor 12 is a computer device to be operated for performing maintenance to or managing the storage apparatus 4, and, for instance, is configured from a laptop personal computer or the like. The service processor 12 is connected to the host system 2 via the network 3, and is capable of receiving data or commands from the host system 2. The service processor 12 is able to monitor the occurrence of failures in the storage apparatus 4 and display such failures on a display screen (not shown).

(1-1-2) Logical Configuration of Storage System

Figure 4:
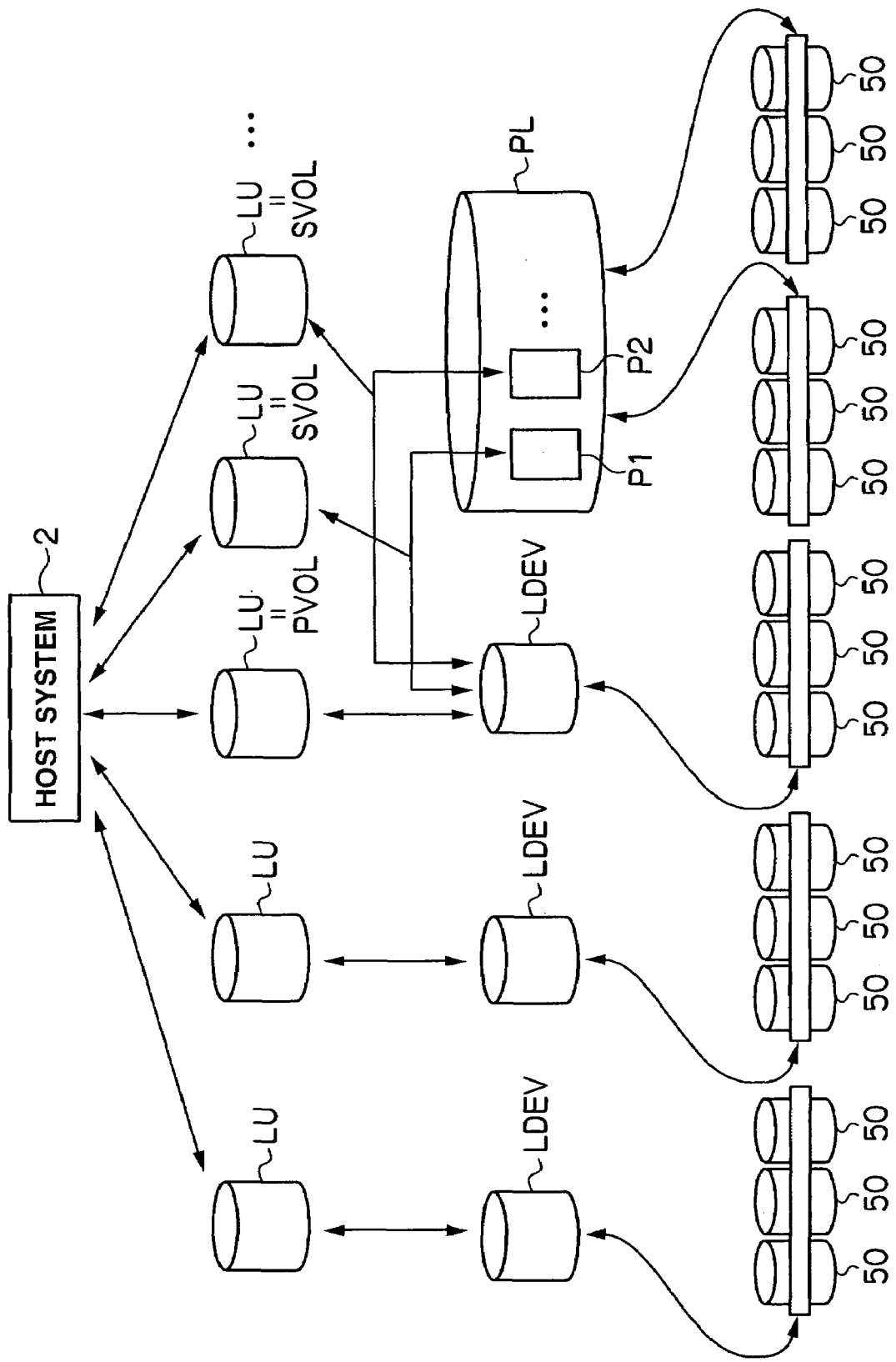
FIG. 4 is a block diagram showing a disk adapter according to an embodiment of the present invention.

The logical configuration of the foregoing storage system 1 is now explained. FIG. 4 is a conceptual diagram showing the logical relationship of the host system 2 and the plurality of hard disk drives 50 in the storage system 1.

In the storage system 1, one or more logical volumes LDEV are defined in a storage extent provided by the plurality of hard disk drives 50.

Each logical volume LDEV is allocated with a unique identifier (LUN: Logical Unit Number). In the case of this embodiment, the input and output of data are performed by combining this identifier and a number (LBA: Logical Block Address) unique to such block allocated to the respective blocks as an address, and designating such address.

Further, a pool volume PL to be dynamically supplied from a storage extent provided by the plurality of hard disk drives 50 is defined according to the data volume of the differential data P1 to Pn.

Moreover, with the storage system 1, a virtual volume mapped with a logical volume LDEV to be accessed by the host system 2 is also defined. As the virtual volume LU, there is a virtual volume LU mapped with a logical volume LDEV as a real volume, and a virtual volume LU mapped with a logical volume LDEV and a pool volume PL.

As the virtual volume LU, there is a primary volume PVOL and a secondary volume SVOL. The secondary volume SVOL is a virtual volume LU to be used for the backup of the primary volume PVOL. Meanwhile, even when a failure occurs in the primary volume PVOL, the secondary volume SVOL can be used to promptly recover the primary volume PVOL.

In this embodiment, the pool volume PL is a dynamic logical volume to be associated with the secondary volume SVOL. Therefore, the pool volume PL is used as a memory storage extent for backing up the primary volume PVOL. Specifically, the pool volume PL stores differential data P1 to Pn of a bitmap corresponding to the data acquired at a prescribed timing in the primary volume PVOL.

With the storage system 1 configured as described above, when the host system 2 accesses the virtual volume LU, data from the host system 2 is read from and written into the logical volume LDEV associated with the virtual volume LU in block units of a prescribed size.

(1-2) Backup Function and Snapshot Function in Present Embodiment

The backup function and snapshot function loaded in the storage apparatus 4 of the storage system 1 are now explained.

The storage system 1 is characterized in that it is able to write data from the host system or simulated data (this is hereinafter referred to as "simulated data") generated from the disk adapter 11 in an arbitrary address of the primary volume PVOL, and back up the data written beforehand in such address as backup data PD and store it in the pool volume PL as the memory storage extent of the primary volume PVOL. Further, the storage system 1 is also characterized in that the backup data PD is differential data P1 to Pn, simulated differential data PS1 to PSn as a differential data group, or a mirror volume PM.

The backup function according to the present embodiment is the function where the storage system 1, upon receiving an I/O from the host system 2, flushes out the data pre-stored in an arbitrary address of the primary volume PVOL and stores such data in the pool volume PL. Therefore, data to be backed up and stored in the pool volume PL will be data (old data) that is one older than the latest data. Latest data from the host system 2 is stored in an unused area formed in an arbitrary address of the primary volume PVOL.

Incidentally, I/O from the host system refers to the read/write request from the host system 2 or the data to be input or output pursuant to such read/write request. The backup processing according to the present embodiment will be described with reference to the write request from the host system 2 and the data to be output pursuant to such write request. Further, the restore processing according to the present embodiment will be described with reference to the read request from the host system 2 and the data to be input pursuant to such read request.

In addition, the snapshot function according to the present embodiment is the function where the storage system 1, upon receiving a snapshot command from the host system 2, creates a replication by copying the data of the storage extent of the primary volume PVOL at such time to the pool volume PL as the memory storage extent of the secondary volume SVOL. With the storage system 1, it is possible to intermittently acquire the replication of data by periodically executing the snapshot function.

(1-2-1) Processing Contents of Disk Adapter

As a means for realizing the foregoing characteristics, as shown in FIG. 3, the memory 111 of the disk adapters 11 in the storage apparatus 4 is provided with a data processing unit 112 for processing an I/O from the host system 2 or a simulated I/O generated by the disk adapters 11.

Incidentally, a simulated I/O is a simulation of the read/write request from the host system 2 and the data to be input and output pursuant to such read/write request, and refers to the simulated read/write request generated from the disk adapters 11 and the simulated data to be input and output pursuant to such simulated read/write request. The backup processing in this embodiment will be described with reference to the simulated write request generated from the disk adapters 11 and the simulated data to be output pursuant to such simulated write request. Further, the restore processing in this embodiment will be described with reference to the simulated read request generated from the disk adapters 11 and the simulated data to be input pursuant to such simulated read request.

The data processing unit 112 stores a differential bitmap 113, a mirroring differential bitmap 114, a pool area management table 115, a generation management table 116, a backup program 117, and a simulated I/O generation program 118.

Figure 5:
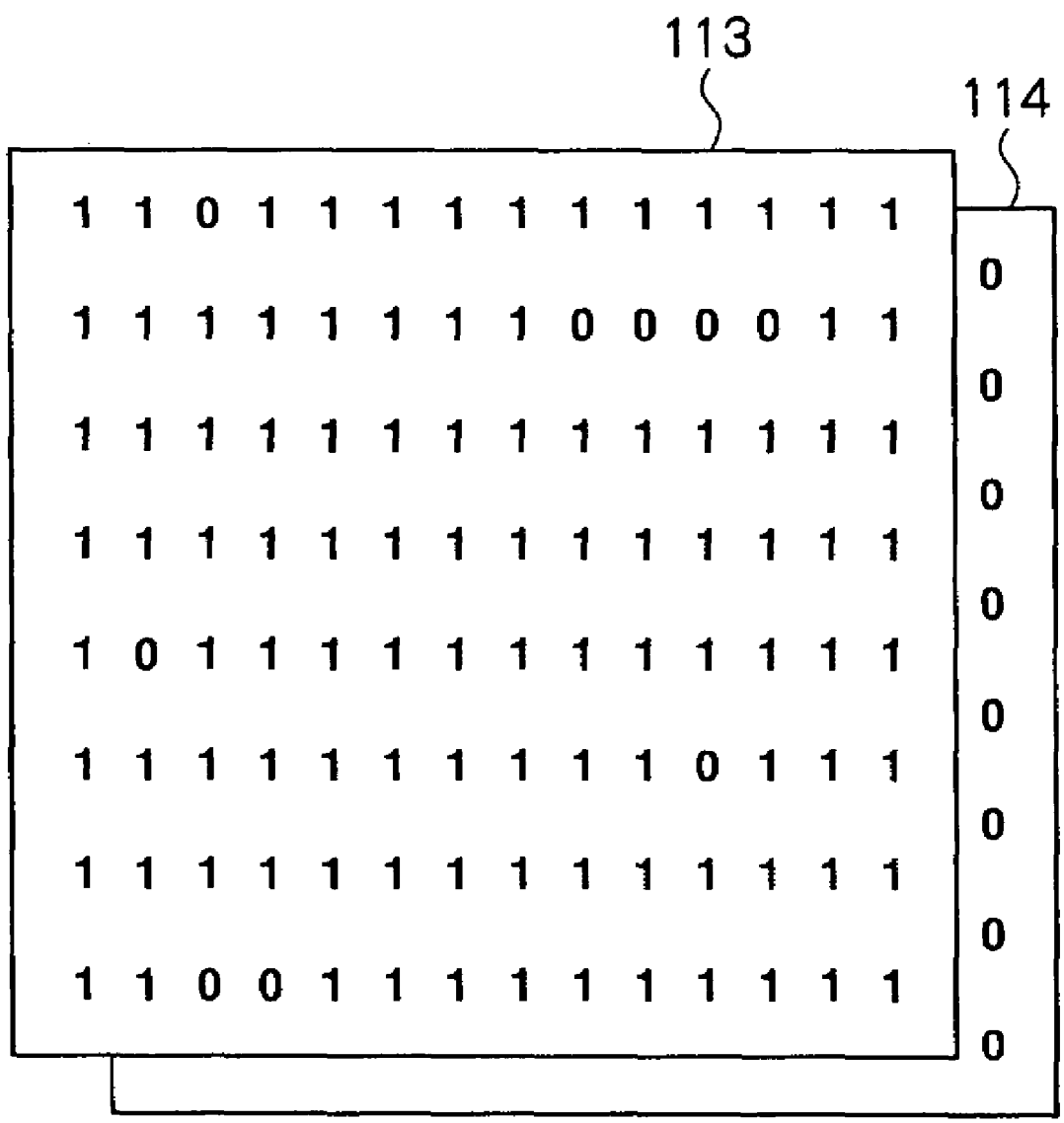
FIG. 5 is a conceptual diagram showing a differential bitmap and a mirroring differential bitmap according to an embodiment of the present invention.

The differential bitmap 113, as shown in FIG. 5, is a table for managing the differential data P1 to Pn in which "0" and "1" corresponding to the respective data stored in the primary volume PVOL are disposed therein.

For example, when certain data is backed up from the primary volume PVOL to the pool volume PL as the memory storage extent of the secondary volume SVOL, and, after such storage thereof, "1" is displayed for indicating that the differential data P1 to Pn have been updated. Updating from "0" to "1", as shown in FIG. 5, is conducted in order from the upper left of the differential bitmap 113.

Meanwhile, when certain data has not been backed up from the primary volume PVOL to the pool volume PL, "0" is displayed for indicating that the differential data P1 to Pn have not yet been updated. Therefore, when there are numerous indications of "1" displayed on the differential bitmap 113, this shows that many data of the primary volume PVOL have been updated, and, when there are numerous indications of "0", this shows that not many data of the primary volume PVOL have been updated.

The mirroring differential bitmap 114, as shown in FIG. 5, is a table for managing all data in which "0" and "1" corresponding to the respective data stored in the primary volume PVOL are disposed therein. The display method of "0" and "1" is the same as the method described regarding the foregoing differential bitmap 113, and the explanation thereof is omitted.

The pool area management table 115, as shown in FIG. 6, is a table for managing the backup data PD to be backed up in the pool volume PL. The pool area management table 115 is configured from a "sequence number" field 115A, an "address" field 115B, and a "data" field 115C.

The "sequence number" field 115A stores a sequence number in which data is to be sequentially backed up from the primary volume PVOL to the pool volume PL. This sequence number is used for protecting the writing order of data. Therefore, smaller the sequence number, older the stored data since the writing order is early, and, larger the sequence number, newer the stored data.

The "address" field 115B stores addresses in the primary volume PVOL.

The "data" field 115C stores the backup data PD to be backed up from the primary volume PVOL to the pool volume PL.

For example, in the pool area management table 115, when the "sequence number" field 115A is "3", this shows that the backup processing into the pool volume PL has been performed thirdly. Here, the backup data PD is data "CCCCC" of address "0x3214" in the primary volume PVOL. Therefore, the larger the sequence number, more recent the backup processing which was performed.

Incidentally, an "update time" field for managing the update time of data can be further provided to the pool area management table 115 for managing the writing order of data together with the sequence number.

The generation management table 116, as shown in FIG. 7, is a table for managing the generation of data to be backed up from the primary volume PVOL to the pool volume PL based on a snapshot command.

Here, the generation of data indicates the data in the primary volume PVOL based on a snapshot command of a certain number. For instance, upon receiving a command of a first snapshot from the host system 2, this shows that data in the primary volume PVOL at the time of the first command is data of the first generation. Similarly, upon receiving a command of a second . . . Nth snapshot from the host system 2, this shows that data in the primary volume PVOL at the time corresponding to such command is data of the second generation . . . Nth generation.

Further, the generation management table 116 is configured from a "generation number" field 116A and a "sequence number" field 116B.

The "generation number" field 116A stores the generation number of data to be backed up from the primary volume PVOL to the pool volume PL based on a snapshot command.

The "sequence number" 116B stores the sequence number for sequentially backing up data from the primary volume PVOL to the pool volume PL.

(1-2-2) Configuration of Pool Volume

Figure 8:
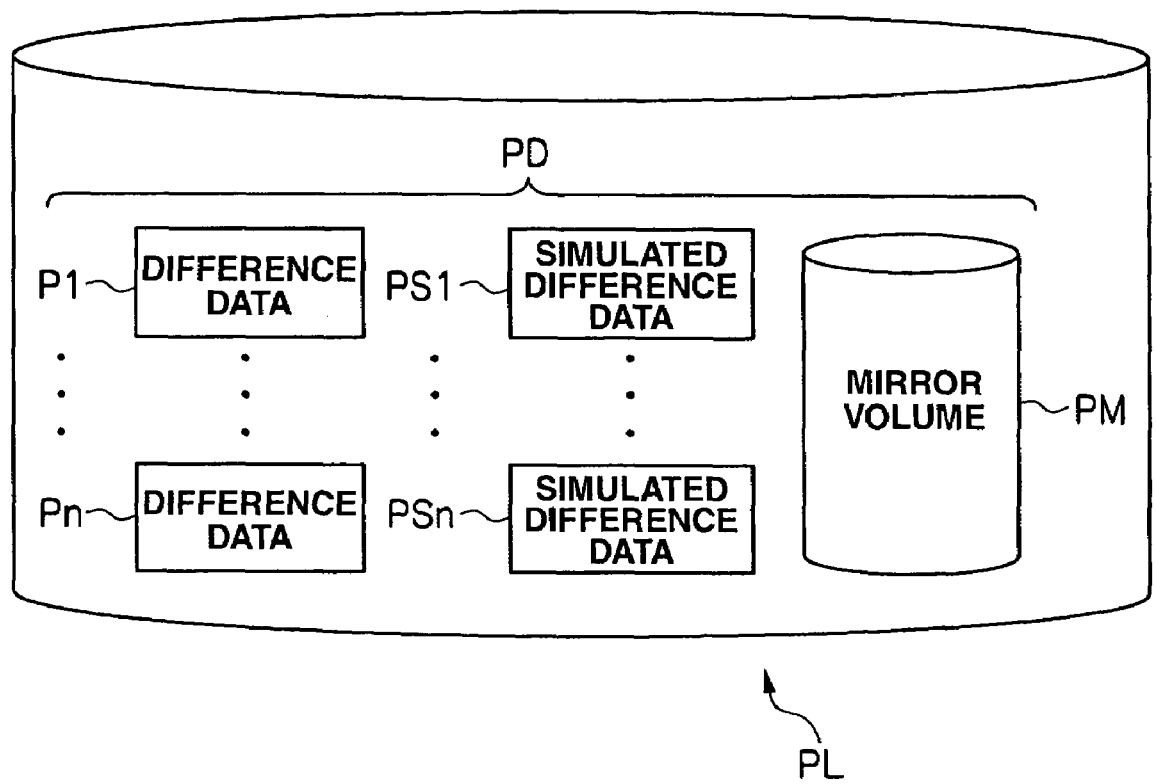
FIG. 8 is a conceptual diagram showing backup data in a pool volume according to an embodiment of the present invention.

The pool volume PL in this embodiment plays the role as a memory storage extent of the secondary volume SVOL. Therefore, the pool volume PL stores the backup data PD, which is the backup data of the primary volume PVOL. As shown in FIG. 8, as the backup data PD, there are differential data P1 to Pn, simulated differential data PS1 to PSn, and a mirror volume PM.

The differential data P1 to Pn are backup data PD which is data stored in an arbitrary address of the primary volume PVOL at an arbitrary time to be stored in the pool volume PL as the differential data P1 to Pn.

Figure 9:
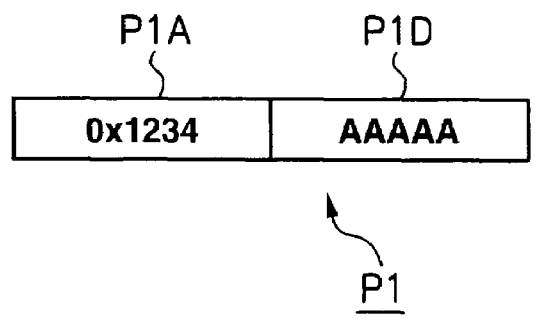
FIG. 9 is a conceptual diagram showing differential data in a pool volume according to an embodiment of the present invention.

Specific differential data P1 is shown in FIG. 9. As the differential data to be stored in the pool area, there is an address P1A in the primary volume PVOL and a differential data P1D of the primary volume PVOL.

The simulated differential data PS1 to PSn are backup data PD in which the unupdated portion is stored in the pool volume PL as the simulated differential data PS1 to PSn when such unupdated portion of data remains even after data to be disposed in the differential bitmap 113 or the mirroring differential bitmap 114 corresponding to the primary volume PVOL is updated.

Figure 10:
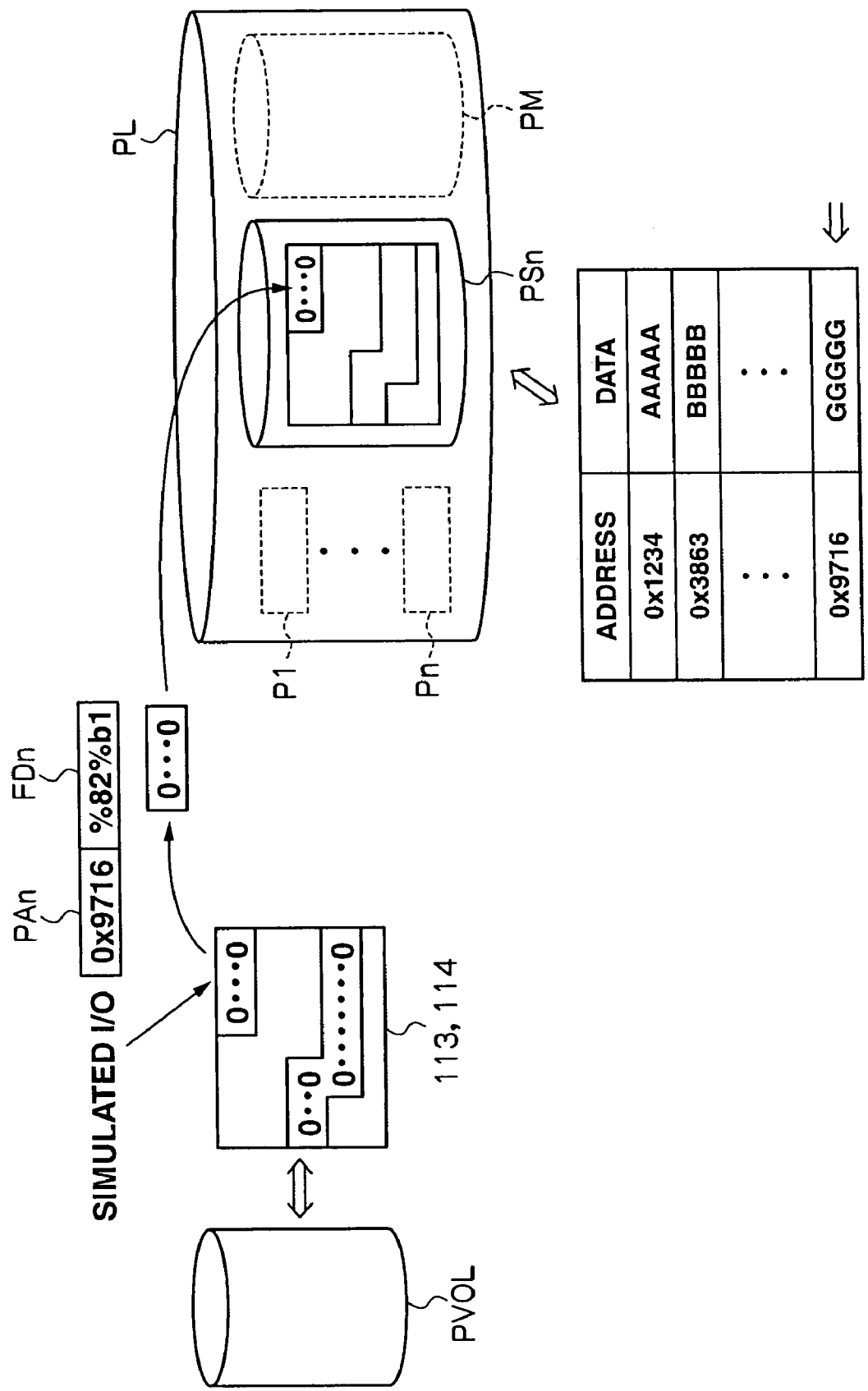
FIG. 10 is an explanation diagram showing simulated differential data in a pool volume according to an embodiment of the present invention.

FIG. 10 shows a conceptual diagram explaining the simulated differential data PS1 to PSn.

When the microprocessor 110 of the disk adapter 11 searches and detects an unupdated portion of data in the differential bitmap 113 or the mirroring differential bitmap 114 corresponding to the primary volume PVOL, it sends a simulated I/O to the address of the unupdated portion. This uses the backup function described above. Normally, the I/O from the host system 2 is sent to an arbitrary address of the primary volume so as to migrate the data stored beforehand in the primary volume PVOL to the pool volume PL. Nevertheless, when there are numerous unupdated portions of data as a result of sending a simulated I/O generated from the disk adapters 11 in the storage apparatus 4 to an arbitrary address of the primary volume PVOL, it is possible to reduce the number of times data is sent from the host system 2. This is because unupdated data in the primary volume PVOL is stored as the simulated differential data PS1 to PSn in the pool volume PL, and latest data is stored in the area which was the unupdated portion. Therefore, this means that the pool volume PL stores data that is one older than the latest data as simulated data.

Here, as shown in FIG. 10, the simulated I/O generated from the disk adapter 11 is configured from an arbitrary address PAn in the primary volume PVOL and an appropriate data FDn.

The simulated data FDn could be any type of data since it merely has to play the role of flushing out the data stored beforehand in an arbitrary address of the primary volume PVOL.

As described above, the microprocessor 10 of the disk adapter 11, as shown in FIG. 10, stores the address in the primary volume PVOL and the simulated differential data as the backup data of the unupdated portion in the secondary volume.

(1-2-3) Operational Outline of Storage System

The operational outline of the storage system 1 according to the present embodiment is now explained.

Foremost, a case is explained where the backup function and the snapshot function in this embodiment are invalid, and an I/O is sent from the host system 2.

Figure 11:
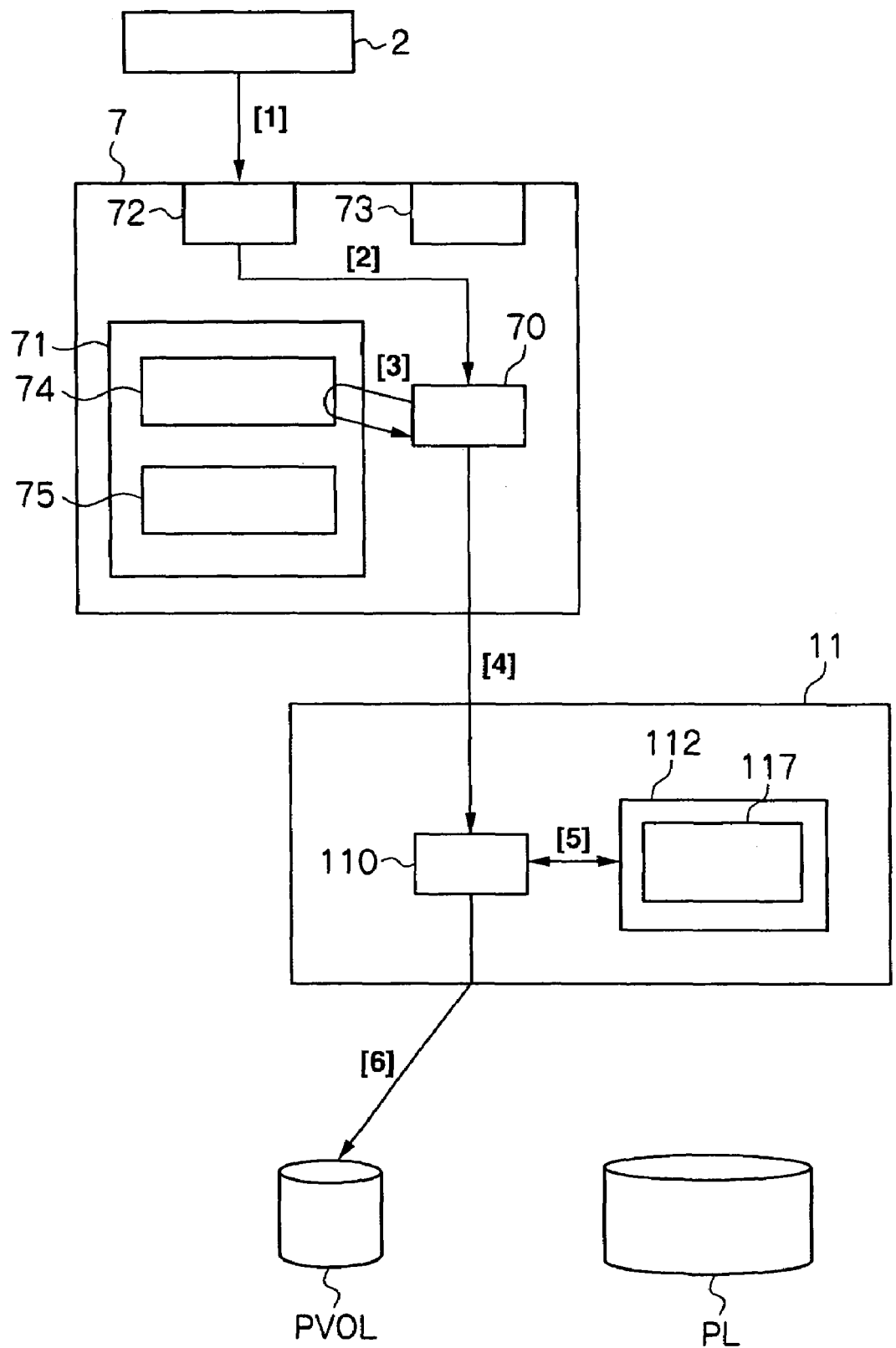
FIG. 11 is a diagram explaining the operation of a storage system according to an embodiment of the present invention.

As shown in FIG. 11, when an I/O sent from the host system enters one port 72 of the channel adapter 7 of the storage apparatus 4 (1), the microprocessor 70 of the channel adapter 7 receives data (2). The microprocessor 70 of the channel adapter 7, through the write command processing unit 74 (3), sends data to the disk adapter 11 (4).

The microprocessor 110 of the disk adapter 11 that received the data refers to the backup program 117 in the data processing unit 112 and confirms whether the backup function and snapshot function are valid or invalid (5). When the microprocessor 110 of the disk adapter 11 confirms that the backup function and snapshot function are invalid, it writes the received data in an arbitrary address of the primary volume PVOL (6).

A case is now explained where the backup function and snapshot function in this embodiment are valid, and a simulated I/O is to be generated from the disk adapter 11.

Figure 12:
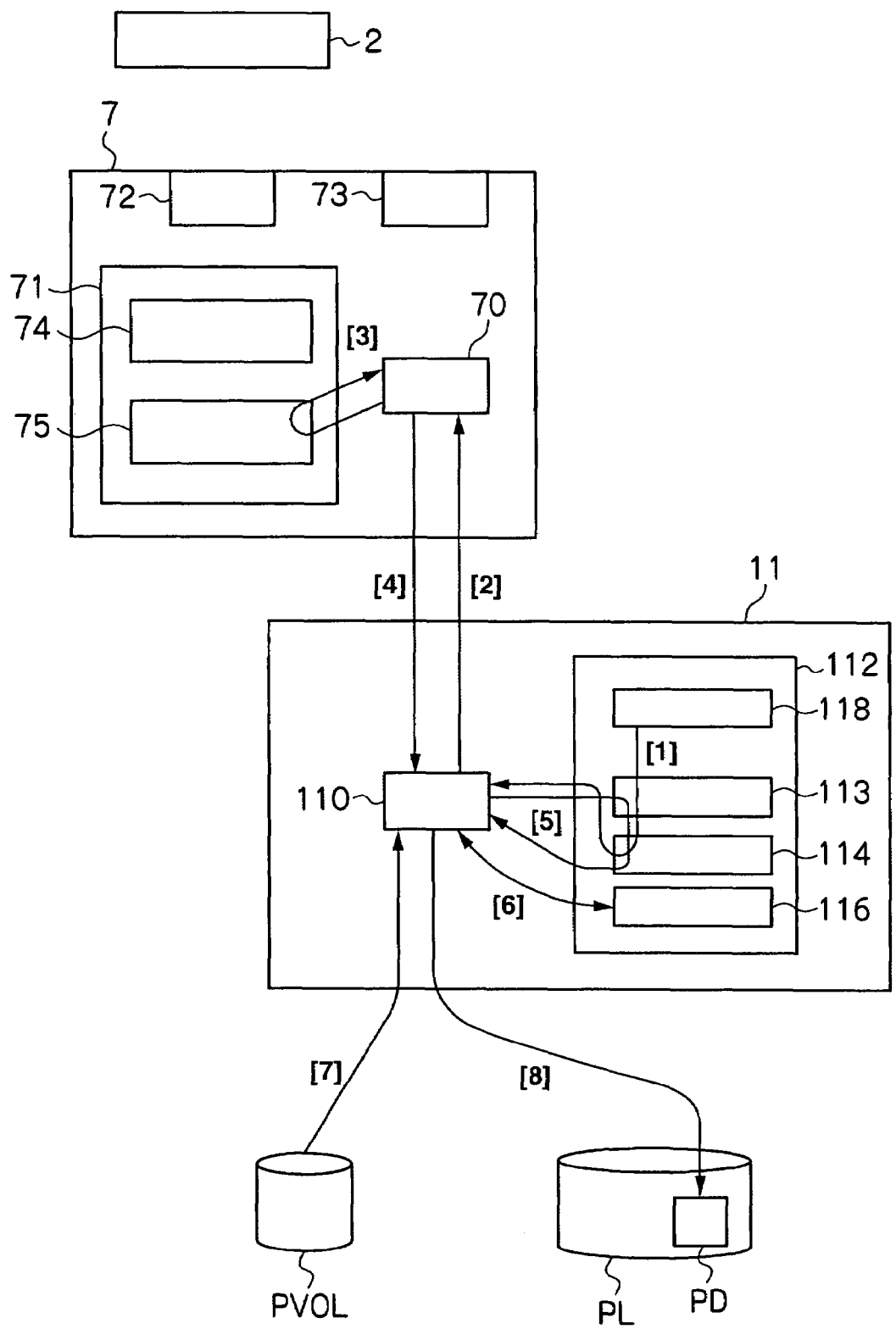
FIG. 12 is a diagram explaining the operation of a storage system according to an embodiment of the present invention.

As shown in FIG. 12, when the microprocessor 110 of the disk adapter 11 refers to the differential bitmap 113 or the mirroring differential bitmap 114 corresponding to the primary volume PVOL and recognizes the unupdated portion of data, it boots the simulated I/O generation program and generates a simulated I/O (1).

The microprocessor 110 of the disk adapter 11 sends the generated simulated I/O to the channel adapter 7 (2).

The microprocessor 70 of the channel adapter 7 that received the simulated I/O executes processing in the I/O loop back processing unit 75 for making a round of the simulated I/O in the channel adapter 7 (3).

Figure 13:
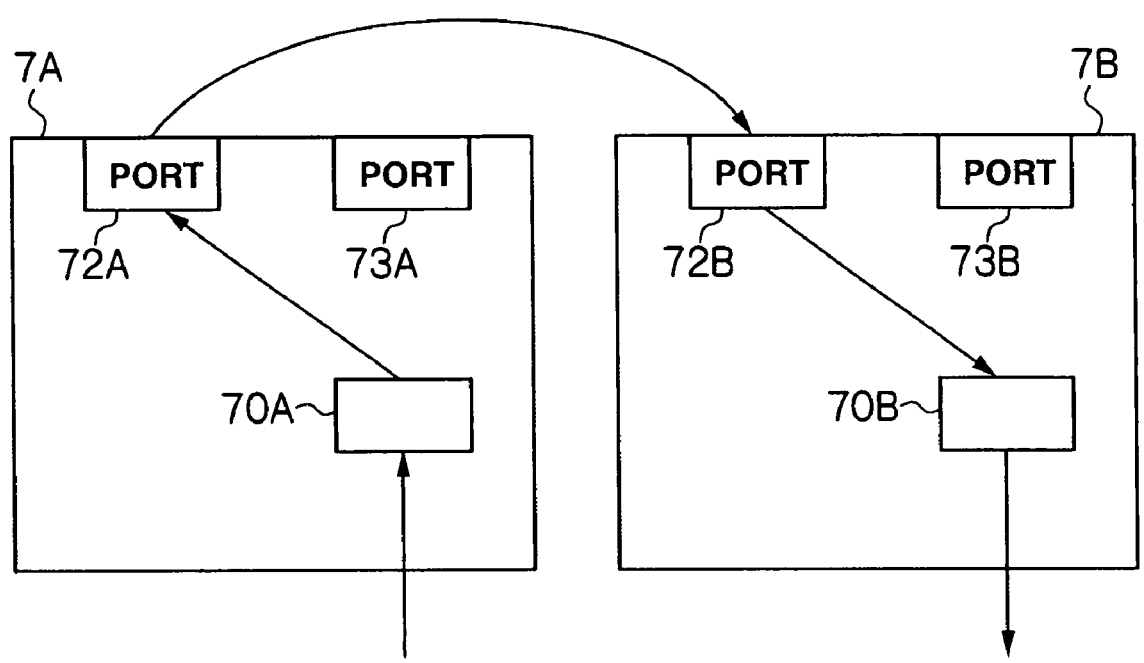
FIG. 13 is a diagram explaining the operation of an I/O loop back processing unit according to an embodiment of the present invention.

Specifically, as shown in FIG. 13, the I/O loop back processing unit 75 constructs a round of processing by assuming two channel adapters 7A, 7B and migrating the simulated I/O in such two channel adapters 7A, 7B.

The operation for constructing a round of processing is as follows. When the microprocessor 70A of the channel adapter 7A receives a simulated I/O from the disk adapter 11, it sends the simulated I/O to another channel adapter 7B via the port 72A. When the microprocessor 70B of the other channel adapter 7B receives the simulated I/O via the port 72B of the other channel adapter 7B, it sends the simulated I/O as is to the disk adapter 11 (4).

Like this, the microprocessor 70 of the channel adapter 7 makes a round of the simulated I/O with the I/O loop back processing unit 75 of the channel adapter.

When the microprocessor 110 of the disk adapter 11 receives the simulated I/O, it determines whether to use the differential bitmap 113 or the mirroring differential bitmap 114, and selects the bitmap to be used (5). The microprocessor 110 of the disk adapter 11 thereafter refers to the backup program 117, and confirms that the backup function and snapshot function are valid (6).

When there is unupdated data in the differential bitmap 113 or the mirroring differential bitmap 114, the microprocessor 110 of the disk adapter 11 sends the simulated I/O to an arbitrary address of the primary volume PVOL, and reads and acquires data from the arbitrary address of the primary volume PVOL (7).

The microprocessor 110 of the disk adapter 11 stores such data as backup data PD in the pool volume PL (8). Here, the microprocessor 110 of the disk adapter 11 treats the unupdated portion in the differential bitmap 113 or the mirroring differential bitmap 114 as having been updated.

(1-2-4) Processing Contents of Microprocessor

In the operational outline of this storage system 1, the difference in the processing when the microprocessor 110 of the disk adapter 11 receives an I/O from the host system 2 or a simulated I/O generated from the disk adapter 11 is now explained. This processing is executed by the microprocessor 110 of the disk adapter 11 based on the backup program 117. Incidentally, although this processing explains a case of the microprocessor 110 using the mirroring differential bitmap 114, the same processing may be performed in the case of using the differential bitmap 113.

Figure 14:
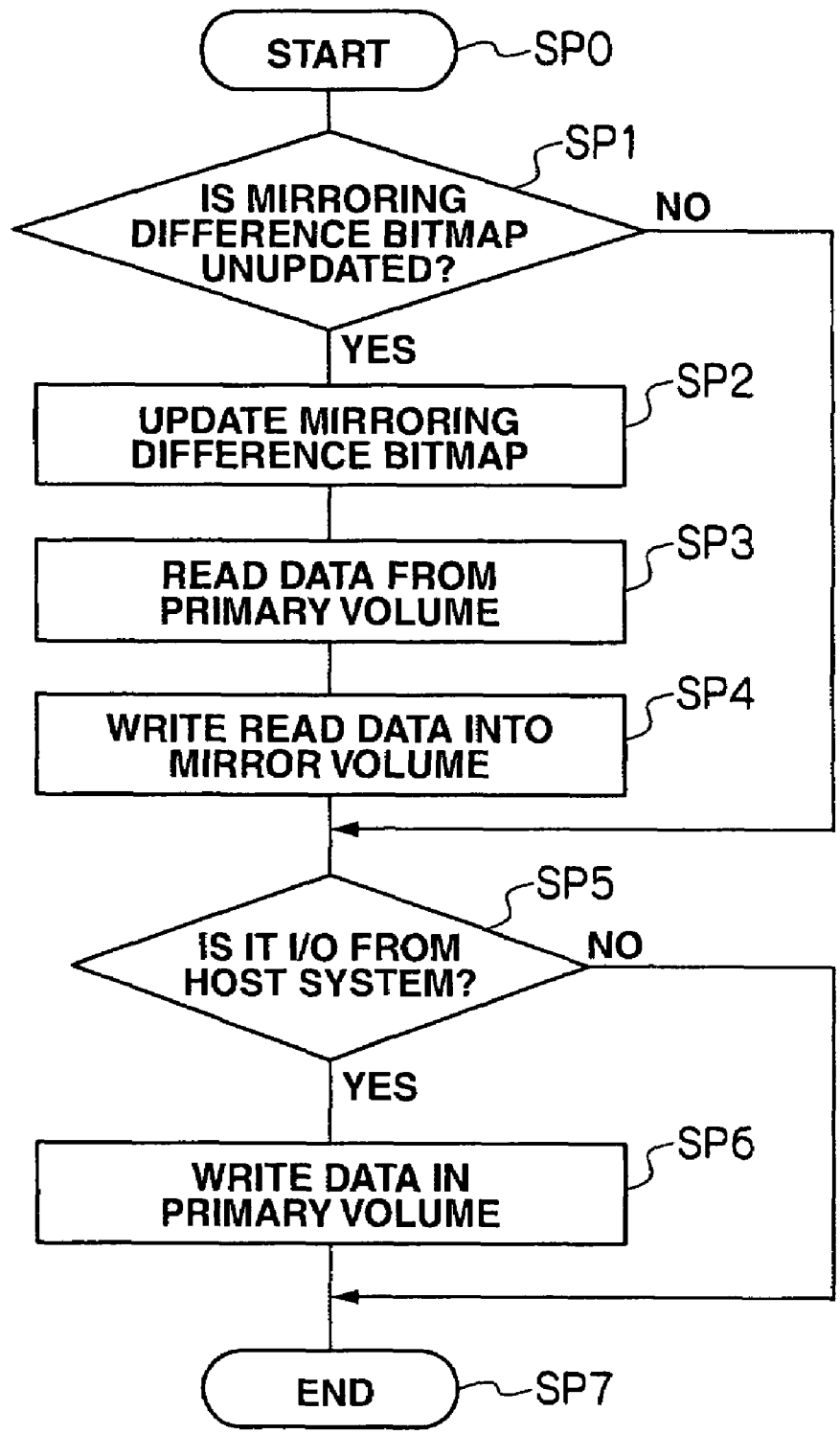
FIG. 14 is a flowchart for distinguishing an I/O from a host system and a simulated I/O according to an embodiment of the present invention.

Foremost, as shown in FIG. 14, the processing is started by the microprocessor 110 of the disk adapter 11 receiving from the channel adapter 7 an I/O from the host system 2 or a simulated I/O generated from the disk adapter 11 (SP0).

Subsequently, the microprocessor 110 of the disk adapter 11 determines whether the mirroring differential bitmap 114 is unupdated (SP1).

When it is determined that the mirroring differential bitmap 114 is unupdated (SP1: YES), the microprocessor 110 of the disk adapter 11 treats the mirroring differential bitmap 114 as having been updated (SP2). The microprocessor 110 of the disk adapter 11 thereafter reads and acquires data from the primary volume PVOL (SP3), and writes the read data in a mirror volume as backup data PD (SP4).

Meanwhile, when the microprocessor 110 of the disk adapter 11 determines at step SP1 that the mirroring differential bitmap 114 has been updated (SP1: NO), it performs the subsequent processing at step SP5.

Subsequently, the microprocessor 110 of the disk adapter 11 determines whether an I/O has been sent from the host system (SP5), and, when it determines that it is an I/O from the host system (SP5: YES), the microprocessor 110 of the disk adapter 11 writes the latest data from the host system in the primary volume (SP6), and ends this processing (SP7).

Meanwhile, when the microprocessor 110 of the disk adapter 11 that it is not an I/O from the host system but rather a simulated I/O (SP5: NO), it ends this processing directly (SP7).

(1-2-5) Simulated I/O Generation Processing

Processing for generating a simulated I/O from the disk adapter 11 is now explained. This processing is executed by the microprocessor 110 of the disk adapter 11 based on the simulated I/O generation program 118.

Figure 15:
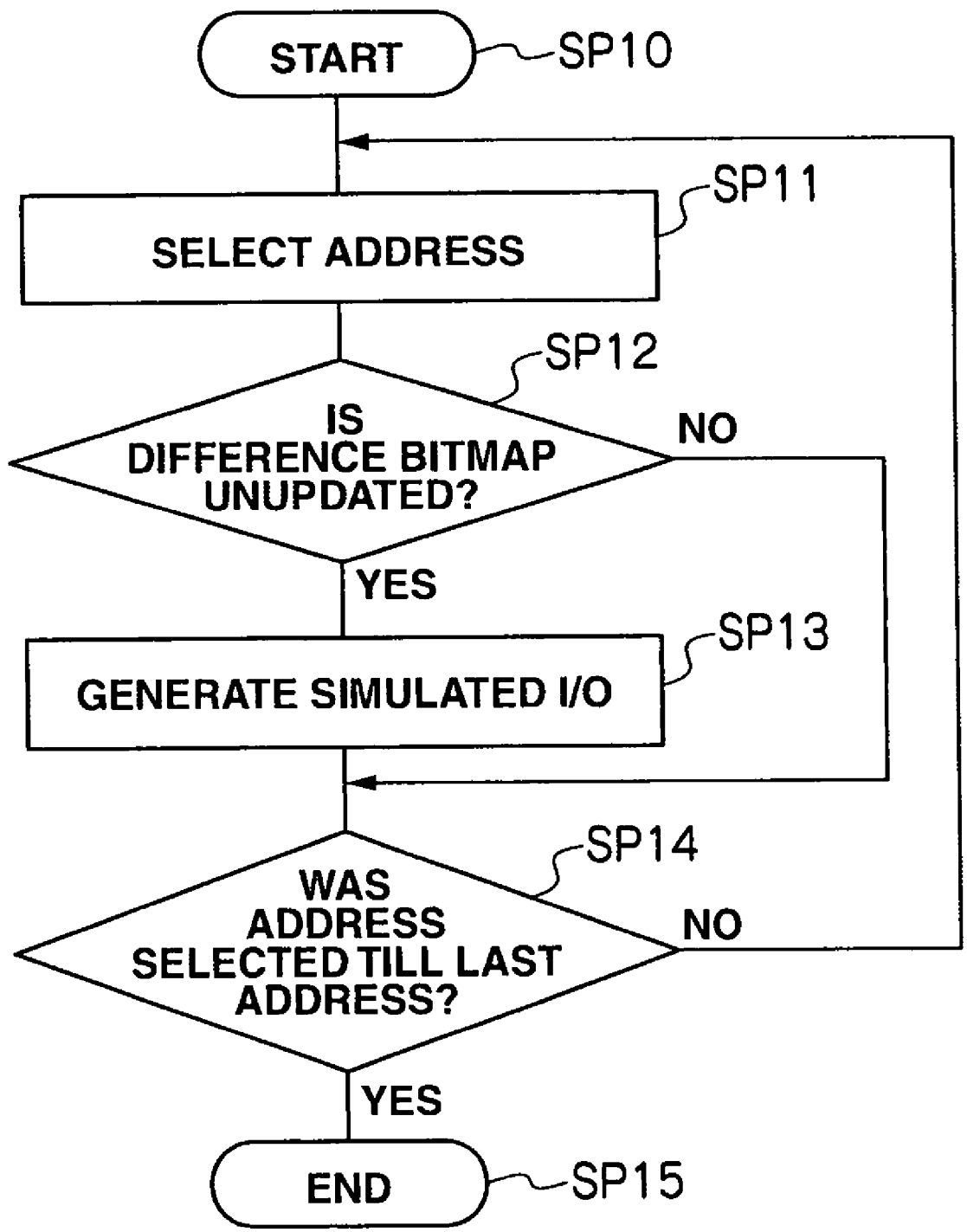
FIG. 15 is a flowchart for generating a simulated I/O according to an embodiment of the present invention.

Foremost, as shown in FIG. 15, the microprocessor 110 of the disk adapter 11 starts this processing upon using the differential bitmap 113 or the mirroring differential bitmap 114 corresponding to the primary volume in the operational outline of the storage system 1 described above (SP10).

The microprocessor of the disk adapter 11 selects one address at a time from the top address in the differential bitmap 113 or the mirroring differential bitmap 114 (SP11).

Subsequently, the microprocessor 110 of the disk adapter 11 determines whether the selected address in the differential bitmap 113 or the mirroring differential bitmap 114 is data of an unupdated portion (SP12). In other words, the microprocessor 110 of the disk adapter 11 determines whether the selected address in the differential bitmap 113 or the mirroring differential bitmap 114 is "0" or "1".

When the microprocessor 110 of the disk adapter 11 determines that the selected address in the differential bitmap 113 or the mirroring differential bitmap 114 is data of an unupdated portion (SP12: YES), is sends a simulated I/O to such selected address (SP13). This is in order to flush out data of such unupdated portion from the primary volume and create an unused area.

Meanwhile, at step SP12, when the microprocessor 110 of the disk adapter 11 determines that the selected address in the differential bitmap 113 or the mirroring differential bitmap 114 is not data of an unupdated portion (SP12: NO), it proceeds to the processing at step SP14.

The microprocessor 110 of the disk adapter 11 determines whether addresses up to the last address in the differential bitmap 113 or the mirroring differential bitmap 114 have been selected (SP14).

When the microprocessor 110 of the disk adapter 11 determines that addresses up to the last address in the differential bitmap 113 or the mirroring differential bitmap 114 have been selected (SP14: NO), it returns to step SP11 and selects the subsequent address.

Meanwhile, when the microprocessor 110 of the disk adapter 11 determines that addresses up to the last address in the differential bitmap 113 or the mirroring differential bitmap 114 have not been selected (SP14: YES), it sends a simulated I/O to data of all target unupdated portions, and, since data of the unupdated portion in the primary volume has been read, it ends this processing (SP15).

In particular, when the microprocessor 110 of the disk adapter 11 selects and uses the mirroring differential bitmap 114, it sends a simulated I/O to an address at the upper left of the bitmap, and treats data of all unupdated portions in the mirroring differential bitmap 114 has having been updated.

(1-2-6) Backup Processing

Sequential backup processing in the storage system 1 is now explained regarding how the data stored in the primary volume PVOL is backed up in the pool volume PL using the various tables and operational outline described above.

Figure 16:
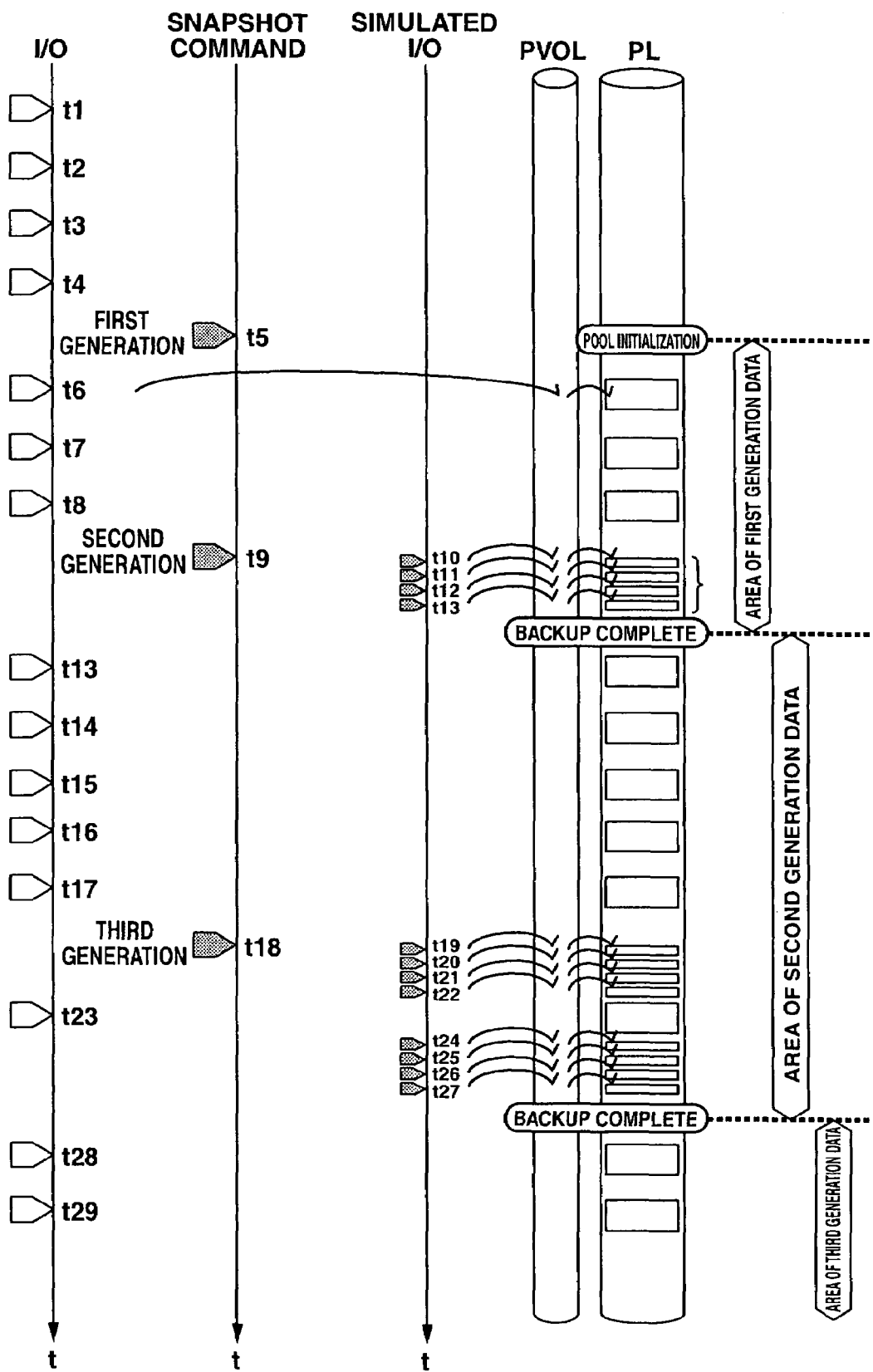
FIG. 16 is an explanatory diagram showing backup processing of a storage system according to an embodiment of the present invention.

FIG. 16 shows a time series of the I/O from the host system 2, snapshot command from the host system 2, and simulated I/O generated from the disk adapter 11 in the vertical axis t, and the conceptual diagram of the primary volume PVOL and the pool volume PL corresponding to such time series.

Foremost, when an I/O from the host system 2 has been sent and a snapshot command has not yet been issued (t1 to t4), after the performance of the operation order (1 to 6) of the storage system 1 explained with reference to FIG. 11, data from the host system 2 is written in the primary volume PVOL.

Figure 17:
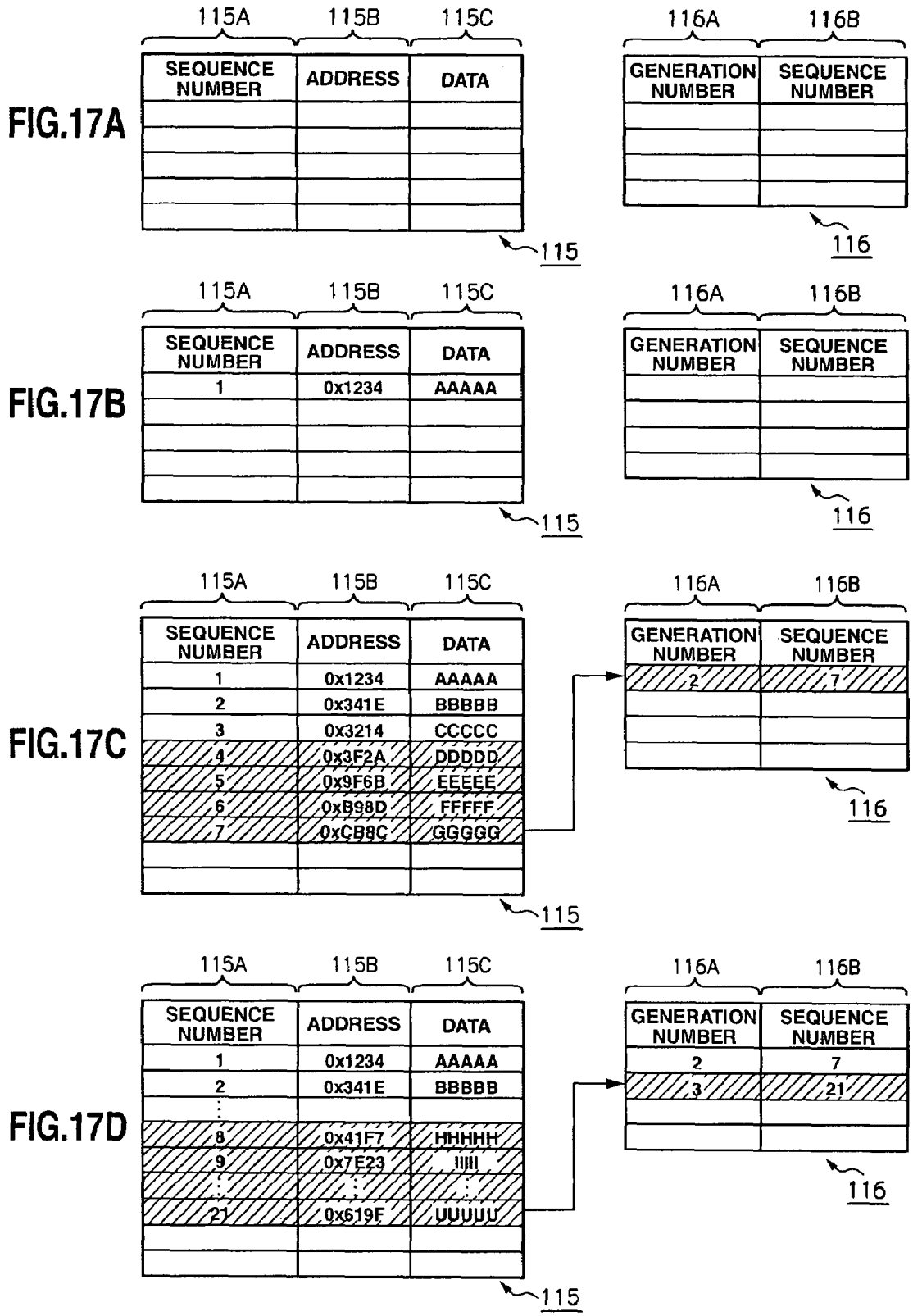
FIG. 17A to 17D are conceptual diagrams showing various tables explaining backup processing of a storage system according to an embodiment of the present invention.

When the host system 2 issues a first generation snapshot command at an arbitrary timing (t5), the microprocessor 110 of the disk adapter 11 initializes the pool volume PL. To initialize the pool volume PL means to initialize the pool area management table 115 and the generation management table 116 as shown in FIG. 17A. Backup processing of data in the primary volume PVOL is then started.

Subsequently, when the host system 2 sends an I/O to an arbitrary address of the primary volume PVOL (t6 to t8), it uses the backup function and snapshot function of the storage system 1 to read the data stored beforehand in the primary volume PVOL, and store such data as differential data P1 to Pn in the pool volume PL. As shown in FIG. 17B, the pool area management table 115 stores, for instance, differential data P1 acquired at time t6.

Thereafter, when the host system 2 issues a second generation snapshot command (t9), the disk adapter 11 sends a simulated I/O for backing up all data stored in the primary volume PVOL (t10 to t13). Since data of the primary volume PVOL is stored beforehand in the pool volume PL as differential data P6 to P8 at time t6 to time t8, here, data of the unupdated portion among the data of the primary volume PVOL is stored as simulated differential data PS1 to PSn. When generating a simulated I/O, the backup efficiency will improve in comparison to sending an I/O from the host system 2 since backup processing can be performed in just the storage apparatus 4.

As shown in FIG. 17C, simulated differential data acquired at time t10 to time t13 is stored as differential data groups P10 to P13 in the pool area management table 115. Since the first backup processing is not yet complete at time t10 to time t13, data during this period is the first generation backup data PD. In FIG. 16, the first generation backup data PD has a generation of "1" and a sequence number of "7", but the subsequent generation number is entered in the "generation number" field 116A of the generation management table 116. Thus, a generation number of "2" and a sequence number of "7" as the simulated differential data of the end of the first generation are stored in the generation management table 116.

When the first backup is complete, the disk adapter 11 is able to acquire the first generation backup data. As shown in FIG. 17C, the area of the first generation backup data will be where the sequence number is 1 to 7.

Like this, the storage of the differential data P1 to P3 and the differential data P4 to P7 as simulated differential data in a pool volume results in the backup of all data of the first generation primary volume PVOL.

Subsequently, at time t13 to time t17, data stored in the primary volume PVOL is stored as differential data P13 to P17 in the pool volume PL pursuant to the I/O sent from the host system 2.

When the host system issues a third generation snapshot command (t18), at time t19 to time t22, the disk adapter 11 generates a simulated I/O and stores simulated differential data as the differential data group P19 to P22 in the pool volume PL. Here, when an I/O is sent from the host system 2 (t23), the disk adapter 11 stores this as differential data in the pool volume PL. At time t24 to time t27, the disk adapter 11 generates a simulated I/O and stores simulated differential data as the differential data group P24 to P27 in the pool volume.

When the second backup is completed as described above, the disk adapter 11 is able to acquire the second generation backup data. As shown in FIG. 17D, the area of the second generation backup data will be where the sequence number is 8 to 27.

Subsequently, the third generation backup data can be acquired similarly.

In the present embodiment, although only data of the unupdated portions was stored in the pool volume PL as the simulated differential data PS1 to PSn each time a snapshot command from the host system 2 was given to the primary volume, the primary volume PVOL storing beforehand all data may also be stored as a mirror volume PM in the pool volume PL.

Needless to say, operation of the storage system 1 of storing the primary volume PVOL as the mirror volume PM in the pool volume PL may be performed in parallel with the operation of storing the differential data and simulated differential data in the pool volume PL.

Even when storing the primary volume PVOL as the mirror volume PM in the pool volume PL, as described above, backup will be completed by generating a simulated I/O and migrating all data.

When an I/O is sent from the host system 2 while the backup data PD is being stored in the pool volume PL based on a simulated I/O from the disk adapter 11, priority may be given to either the I/O from the host system or the simulated I/O upon storing the backup data PD in the pool volume PL. If the backup efficiency is to be improved, priority is given to the simulated I/O for storing the backup data PD.

(1-2-7) Restore Processing

The processing for restoring backup data PD stored in the pool volume PL based on backup processing into the primary volume PVOL at an arbitrary timing is now explained. Sequential backup processing in the storage system 1 is now explained regarding how the data stored in the primary volume PVOL is backed up in the pool volume PL using the various tables and operational outline described above. Incidentally, differential data P1 to Pn will be used as the backup data PD in the explanation.

Figure 18:
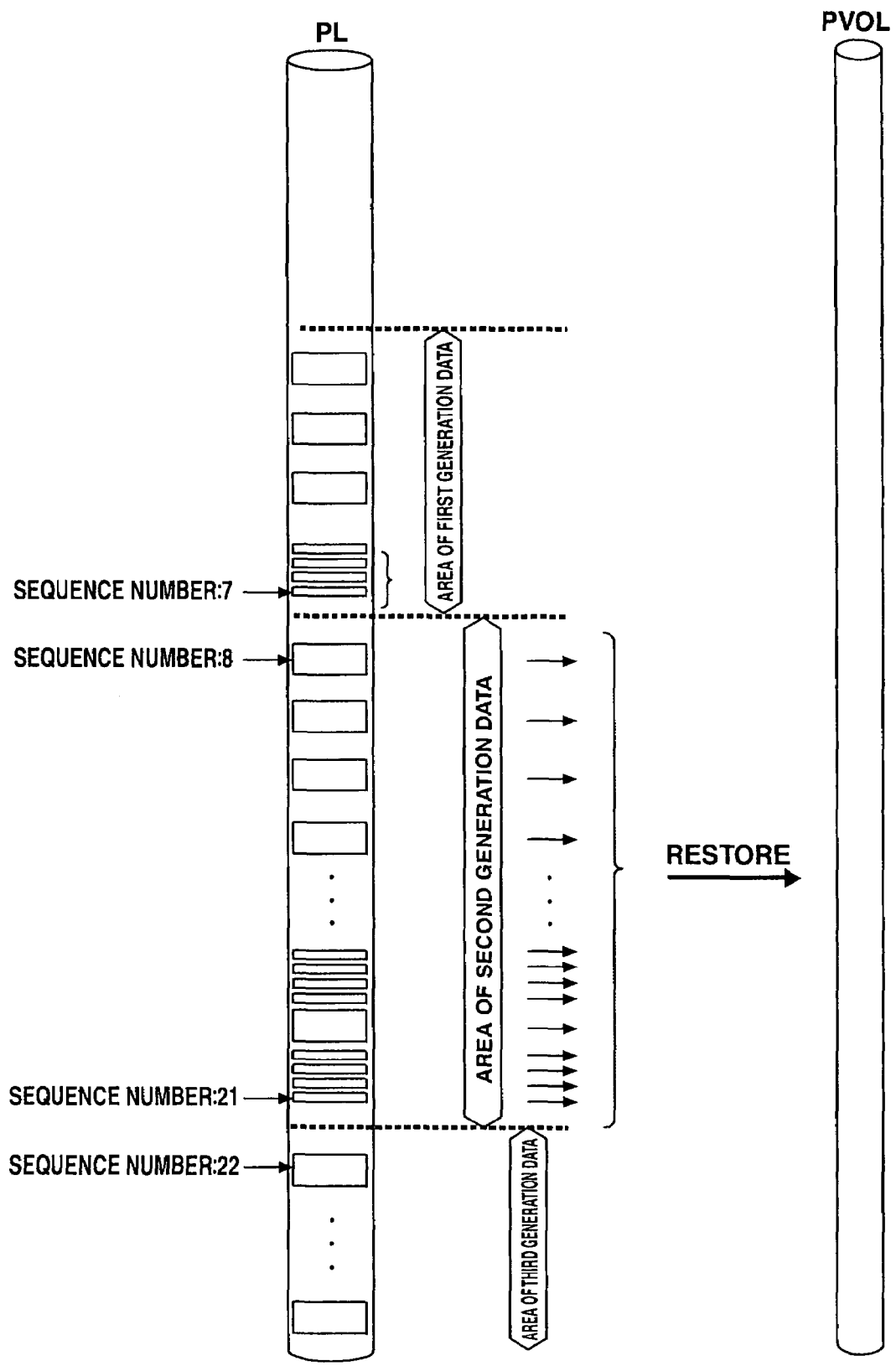
FIG. 18 is an explanatory diagram showing restore processing of a storage system according to an embodiment of the present invention.

As shown in FIG. 18, for instance, a case is explained where the area of second generation data is restored from the pool volume PL to the primary volume PVOL.

Figure 19:
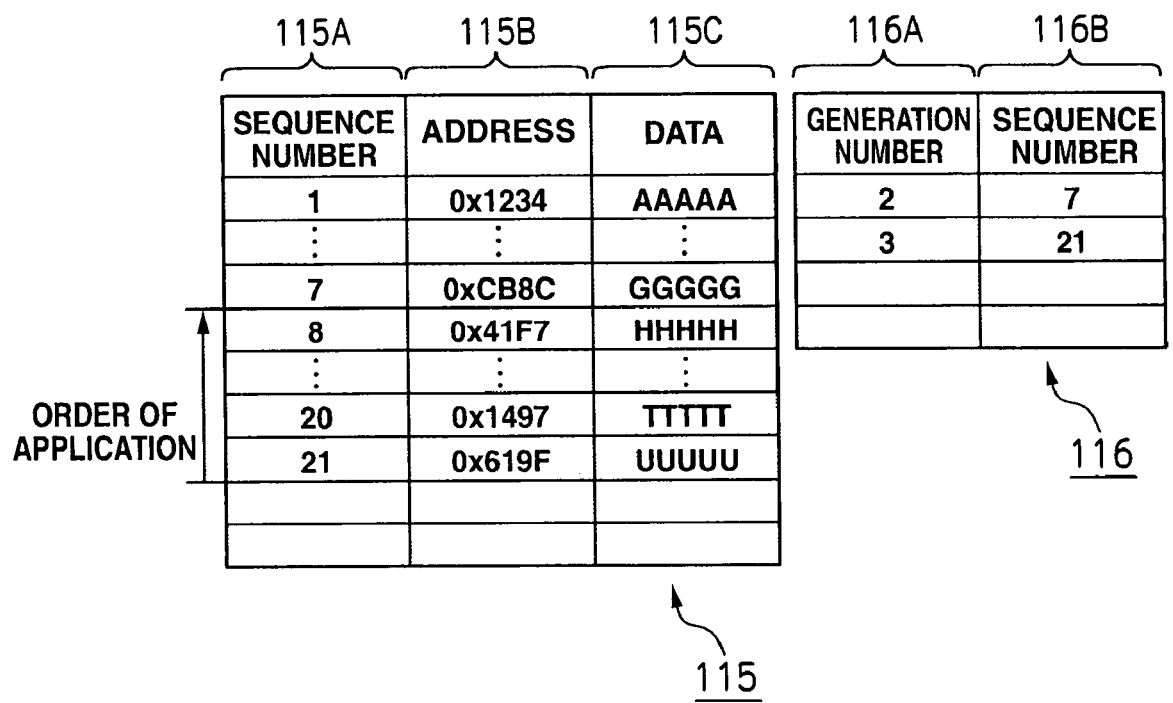
FIG. 19 is a conceptual diagram showing various tables explaining restore processing of a storage system according to an embodiment of the present invention.

As shown in FIG. 19, differential data P1 to Pn are managed with the pool area management table 115 and the generation management table 116. Since it is evident from the generation management table 116 that the second generation is immediately after sequence number 7, the area of the second generation data will be from a sequence number of 8 to 21. Further, since the sequence number shows the writing order of data, restoration must be performed from new data to old data. Therefore, as order of performing restoration, differential data P8 to P21 should be restored in order from the sequence number of 21 to 8.

Figure 20:
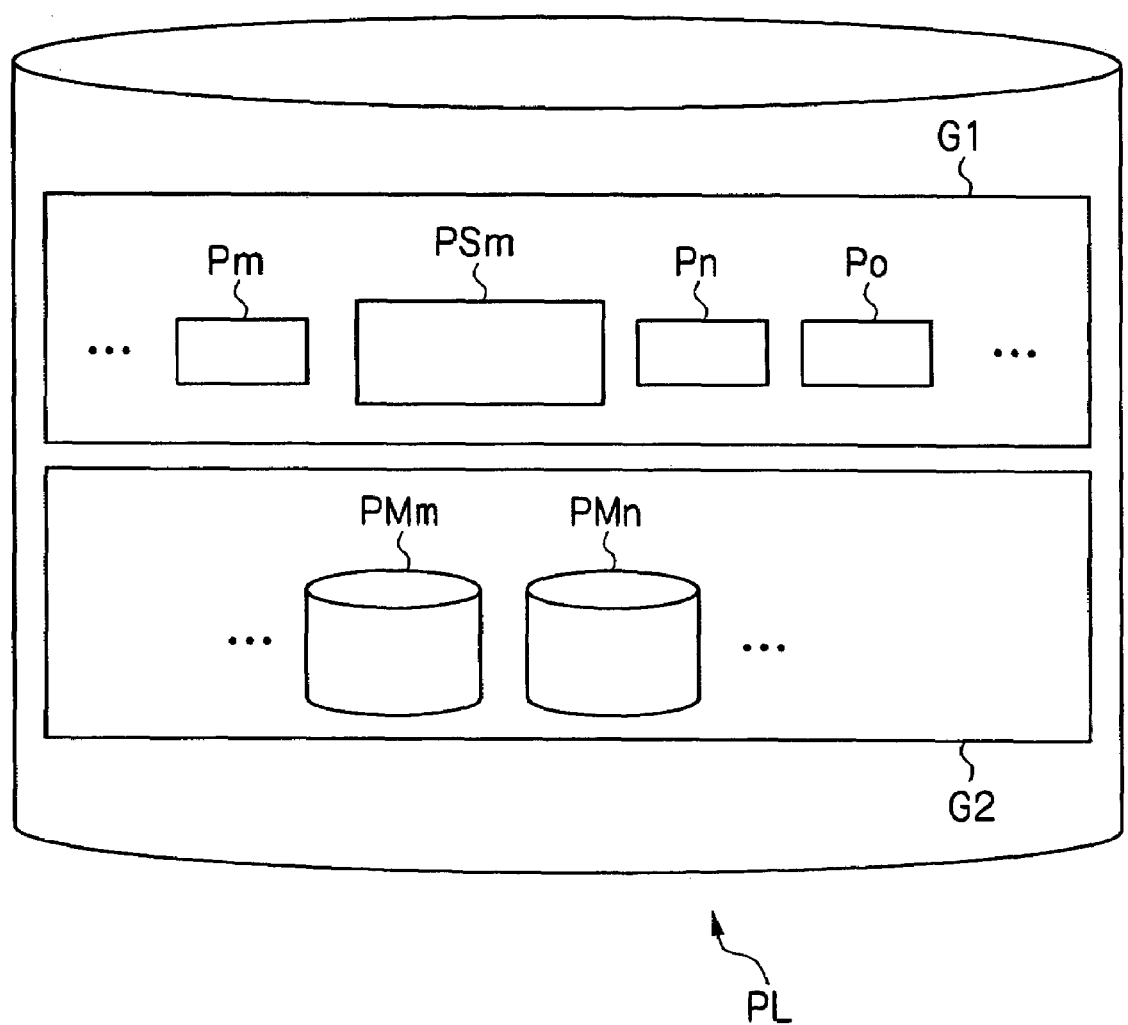
FIG. 20 is a conceptual diagram in a pool volume showing restore processing of a storage system according to an embodiment of the present invention.

Upon performing this restoration, as shown in FIG. 20, it is also possible to group and store the backup data PD to be stored beforehand in the pool volume PL.

For example, a user sets failure groups G1, G2 beforehand in the pool volume PL. Differential data P1 to Pn and simulated differential data PS1 to PSn are stored in one failure group G1, and a mirror volume PM is stored in the other failure group G2. As a result of the foregoing storage, even when the primary volume PVOL, failure group G1 or failure group G2 is damaged, damaged data can be recovered by restoring one of the remaining two. Specifically, when a failure occurs in the primary volume PVOL and data in such volume PVOL is damaged, the primary volume PVOL can be recovered by restoring the backup data PD in one failure group among the failure groups G1, G2.

Like this, since it is possible to recover the primary volume PVOL by using the differential data P1 to Pn and the simulated differential data PS1 to PSn stored in the pool volume PL, it could be said that the differential data P1 to Pn and the simulated differential at a PS1 to PSn are all data at an arbitrary point in time stored beforehand in the primary volume PVOL.

(1-3) Effect of First Embodiment

According to the present embodiment, it is possible to store and manage the differential data as backup data, the simulated differential data and the mirror volume in a pool volume of the storage system as data with consistency, and backup processing and restore processing can be performed at an arbitrary timing.

(2) Second Embodiment

Figure 21:
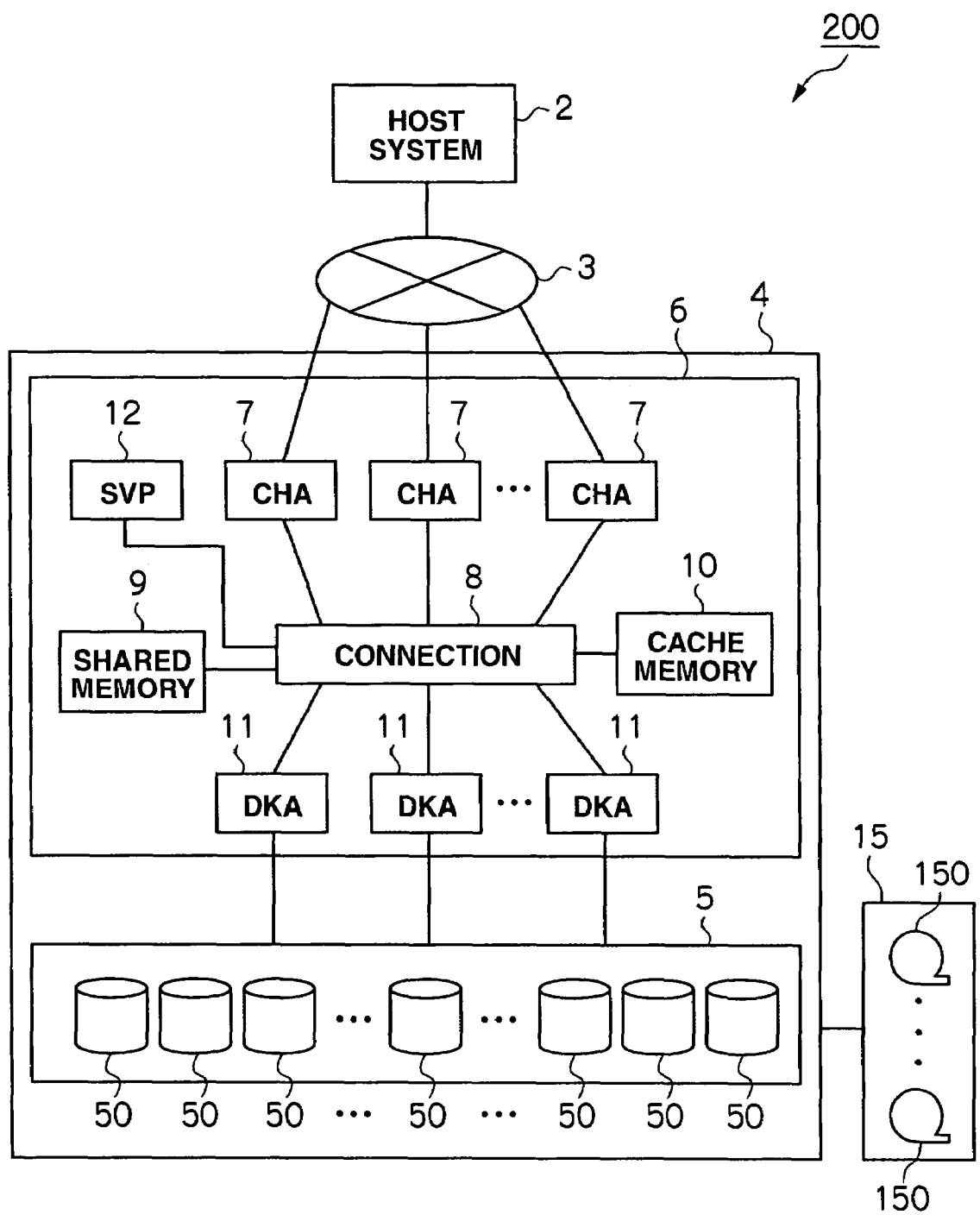
FIG. 21 is a block diagram showing an overall configuration of a storage system according to another embodiment of the present invention.

FIG. 21 shows an overall storage system 200 according to the present embodiment.

The storage system 200 of this embodiment is configured by connecting a tape library device 15 comprising a plurality of tapes 150 to the storage apparatus 4 of the first embodiment as shown in FIG. 21 which is given the same reference numerals for the portions corresponding to those shown in FIG. 1. The plurality of tapes 150 of the tape library device 15 are external recording mediums.

Incidentally, the remaining configuration is the same as the configuration of the storage system 1 according to the first embodiment, and the explanation thereof is omitted. Further, the same reference numeral is given to the same components as in the first embodiment.

Processing for further backing up the tape library device 15 in order to store the backup data PD stored in the pool volume PL of the first embodiment for a long period of time is now explained.

Figure 22:
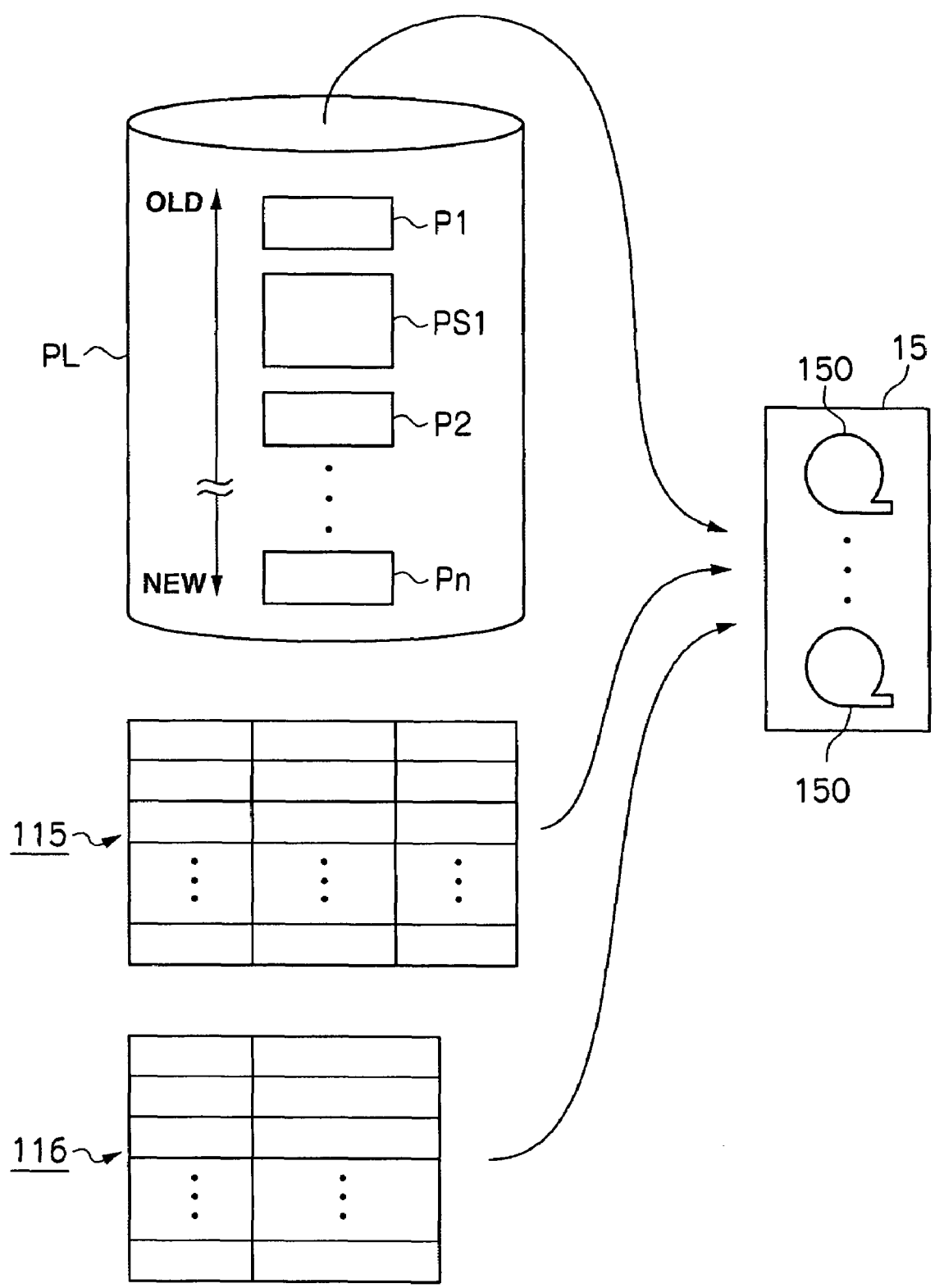
FIG. 22 is an explanatory diagram showing backup processing of a storage system according to another embodiment of the present invention.

As shown in FIG. 22, the disk adapter 11 transfers all backup data stored in the pool volume PL of the first embodiment to the tape library device 15, and replicates such backup data in the tapes 150. In addition, the disk adapter 11 also transfers the pool area management table 115 and the generation management table 116 to the tape library device 15. The pool area management table 115 and the generation management table 116 are managed in the tape library device 15.

Incidentally, processing for storing the backup data PD in the pool volume has been explained in the first embodiment, and the explanation thereof is omitted.

When restoring the backup data replicated in the tapes 150 of the tape library device 15, a logical volume of data of the corresponding generation is created from the pool area management table 115 and the generation management table 116 managed in the tape library device 15, and the backup data, and such volume is replicated in the primary volume.

According to the storage system of the present embodiment, in addition to the effect of the first embodiment, it is possible to replicate backup data of the pool volume in the external recording medium without having to be aware of the type of backup data. Further, since the various tables for managing the backup data are also replicated in the external recording medium, it is possible to restore the desired data with only the data in the external recording medium.

(3) Third Embodiment

Figure 23:
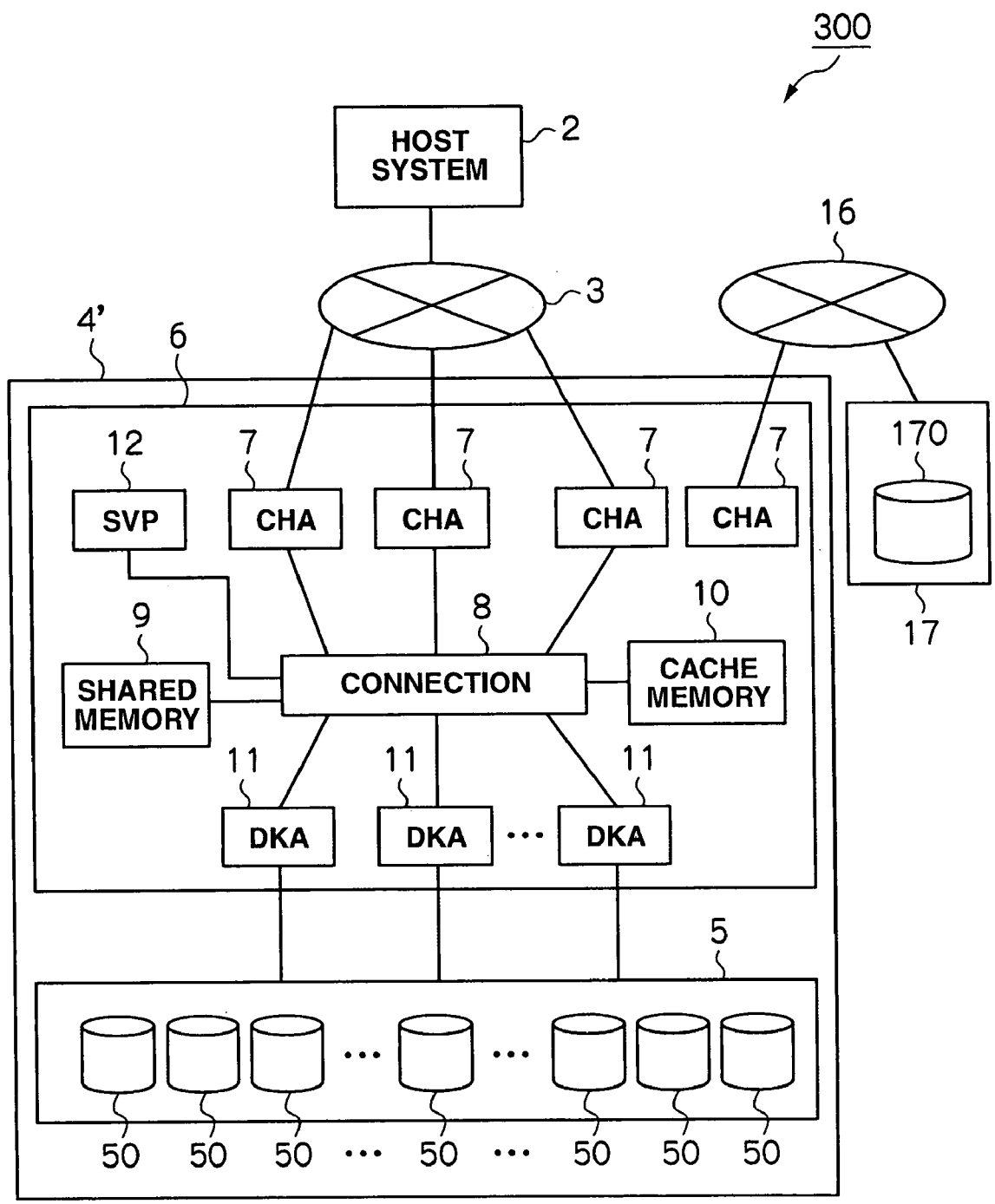
FIG. 23 is a block diagram showing an overall configuration of a storage system according to yet another embodiment of the present invention.

FIG. 23 shows an overall storage system 300 according to the present embodiment.

The storage system 300 according to the present embodiment is configured such that the channel adapter 7 of the storage apparatus 4' is connected to an external storage apparatus 17 via a network 16 as shown in FIG. 23 which is given the same reference numerals for the portions corresponding to those shown in FIG. 1. The external storage apparatus 17 is provided with an external volume 170.

The storage apparatus 4' of this embodiment is equipped with a pool volume PL'. The pool volume PL' further stores metadata PM1 to PMn as data related to the differential data P1 to Pn. The metadata PM1 to PMn are data concerning the creation date and time, creator, data format and the like of the differential data P1 to Pn.

Incidentally, the remaining configuration is the same as the configuration of the storage system 1 according to the first embodiment, and the explanation thereof is omitted. Further, the same reference numeral is given to the same components as in the first embodiment.

Processing for further backing up the external storage apparatus 17 in order to store the differential data P1 to Pn stored in the pool volume PL' of this embodiment for a long period of time is now explained.

Figure 24:
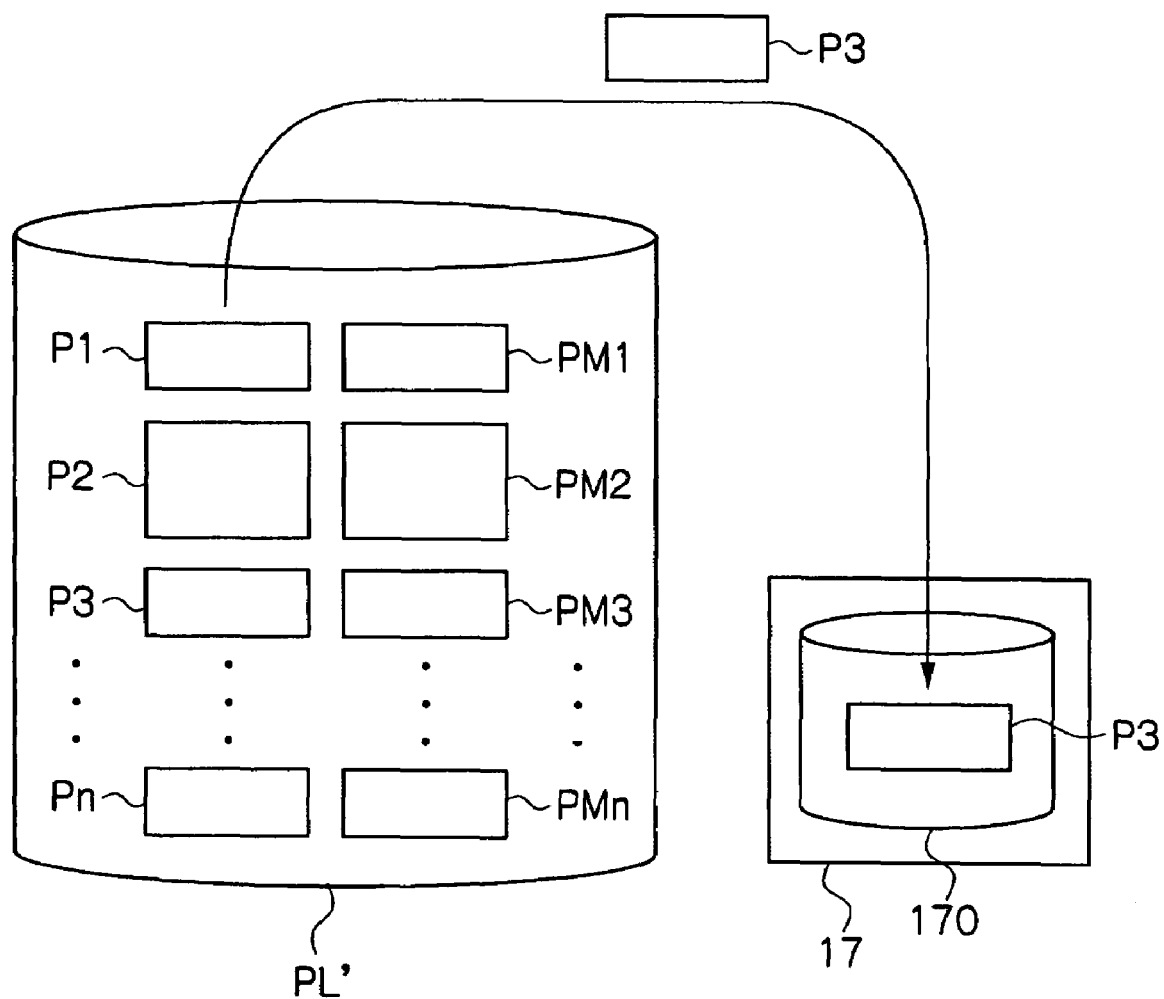
FIG. 24 is an explanatory diagram showing an overall configuration of a storage system according to still another embodiment of the present invention.

As shown in FIG. 24, a part or the whole of the old differential data among the differential data P1 to Pn stored in the pool volume PL' is transferred to and stored in the external volume 170 of the external storage apparatus 17.

Incidentally, as the recording medium for storing the differential data, in addition to the external volume 17, a storage apparatus, tape or WORM area to be newly and separately provided may also be used.

According to the storage system of the present embodiment, in addition to the effect of the first embodiment, it is possible to store only the old differential data in the external storage apparatus since metadata relating to the backup data of the pool volume is stored. Further, it is also possible to delete only the old differential data.

(4) Fourth Embodiment

FIG. 1 shows an overall storage system 400 according to the present embodiment.

Incidentally, the storage system 400 according to this embodiment is configured the same as the storage system 1 of the first embodiment, and the explanation thereof is omitted.

As shown in FIG. 25, the method of storing the backup data in the pool volume PL is as follows.

Figure 26A:
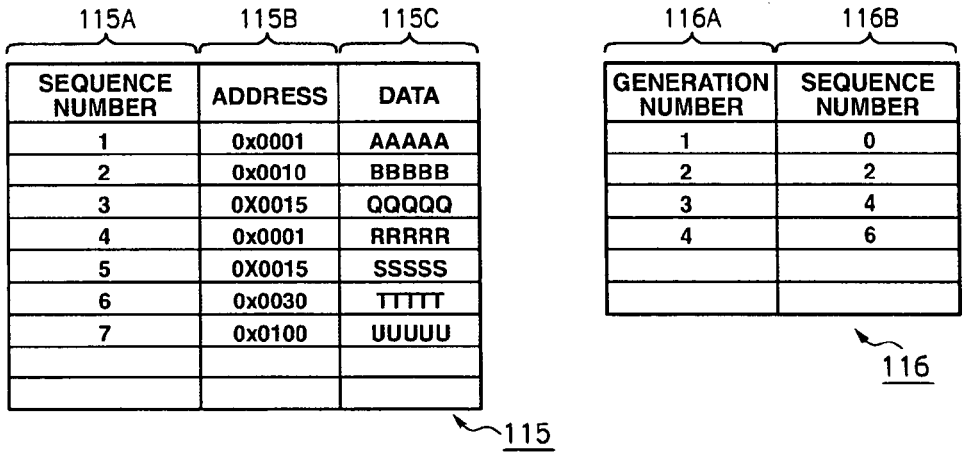
FIG. 26A to 26C are conceptual diagrams showing various tables explaining backup processing of a storage system according to another embodiment of the present invention.

Foremost, the disk adapter 11 creates synthesized data PC1, PC2 by synthesizing a plurality of differential data P1 to Pn. For example, when referring to the generation management table 116 shown in FIG. 26A, the second generation differential data P3, P4 have a sequence number of 3 and 4, and the third generation differential data P5, P6 have a sequence number of 5 and 6. When these differential data P3 to P6 are synthesized, the synthesized data PC1 will become differential data P3 to P6 having sequence numbers of 3 to 6. The same synthesizing method may be used to synthesize differential data P1 to Pn of a plurality of generations.

Figure 26B:
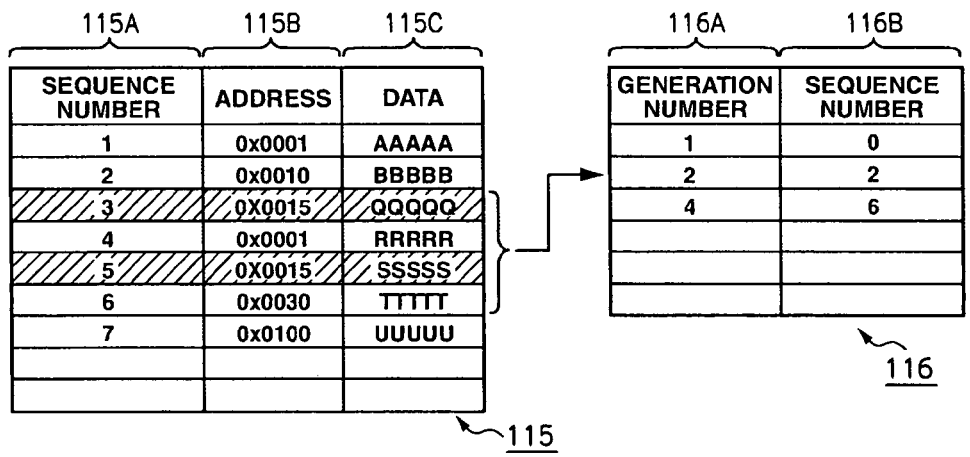
Figure 26C:
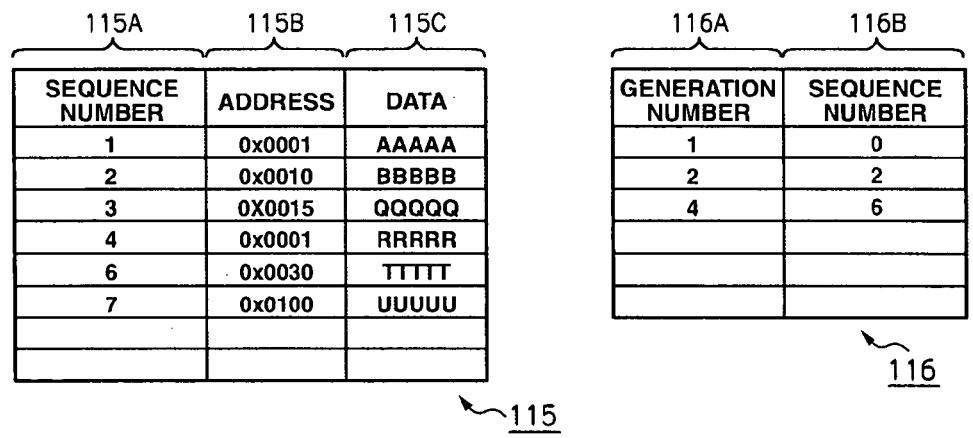

Then, subsequently, the disk adapter 11 compresses data among the synthesized data PC1, PC2 . . . and creates compressed data PP1 . . . . For example, when referring to the pool area management table 115 shown in FIG. 26B, addresses having a sequence number of 3 and 5 are overlapping. Thus, number 3 as the smallest number among the sequence numbers of the overlapped addresses is preserved and synthesized data corresponding to the other sequence number 5 is deleted, whereby it is possible to create compressed data PP1 . . . as shown in FIG. 26C.

The disk adapter 11 is able to further encrypt the compressed data created as described above and store it as data PE1 . . .

According to the storage system of the fourth embodiment, in addition to the effect of the first embodiment, when it is necessary to store old backup data for a long period of time, such old backup data can be efficiently stored in the pool volume. Further, since the old backup data is encrypted, it is possible to prevent such data from being falsified or stolen.

(5) Other Embodiments

In the foregoing embodiments, although the disk adapters 11 and the plurality of hard disk drive 50 of the storage apparatus 4 were used as the creation unit for associating a part or the whole of the storage extent of the secondary volume SVOL and forming a pool volume to be supplied with a dynamic memory storage extent from the logical volume, the disk adapters and the hard disk drives of the externally provided storage apparatus may also be used as the creation unit.

Although the disk adapters 11 and the plurality of hard disk drives 50 in the storage apparatus 4 were used as the first storage unit for storing the differential data P1 to Pn corresponding to the primary volume PVOL in the pool volume PL, the disk adapters and the hard disk drives of the externally provided storage apparatus may also be used as the first storage unit.

Although the unupdated data in the primary volume PVOL was made to be the simulated differential data PS1 to PSn, and the disk adapters 11 and the plurality of hard disk drives 5 in the storage apparatus 4 were used as the second storage unit for storing the simulated differential data PS1 to PSn in the pool volume, the disk adapters and the hard disk drives of the externally provided storage apparatus may also be used as the second storage unit.

Although add data in the primary volume PVOL was made to be the mirror volume PM and the disk adapters 11 and the plurality of hard disk drives 50 in the storage apparatus 4 were used as the third storage unit for storing the pool volume PL, the disk adapters and the hard disk drives of the externally provided storage apparatus may also be used as the third storage unit.

Although the management unit for managing the order of writing the differential data P1 to Pn in the pool volume PL was provided in the memory 111 of the disk adapter 11, the management unit can also be provided as a separate hardware configuration.

The present invention can be broadly applied to a storage system having one or more storage apparatuses, as well as storage systems of other modes.

I claim:

1. A storage system comprising
a controller receiving a plurality of write commands each including respective data of a plurality of data targeted to a corresponding storage area of a plurality of storage areas of a primary volume and controlling storage of the plurality of data of the plurality of write commands to the corresponding storage areas of the primary volume targeted by the plurality of write commands; and
a plurality of disk drives being managed by the controller according to a Redundant Array of Independent/Inexpensive Disks (RAID) system and providing the primary volume and a pool volume, the pool volume storing backup data of the primary volume and providing a secondary volume as a virtual volume mapping the backup data,
wherein the controller manages the primary volume, the secondary volume, the pool volume and a difference bitmap, the pool volume storing a plurality of difference data sets having a corresponding difference data set for each write command of the plurality of write commands, each difference data set including the storage area of the primary volume targeted by the corresponding write command and respective data acquired from the targeted storage area prior to storage of the respective data of the corresponding write command to the targeted storage area, the difference bitmap indicating whether respective data from each of the plurality of storage areas of the primary volume has been stored to the pool volume since completion of a most recent prior backup of the primary volume to the pool volume, wherein the controller generates a plurality of simulated I/O commands each targeting a corresponding storage area of the plurality storage areas of the primary volume from which, according to the difference bitmap, the respective data has not been stored to the pool volume since completion of the most recent prior backup of the primary volume to the pool volume, acquires the respective data from each corresponding storage area of the plurality of storage areas targeted by the plurality of simulated I/O commands, and controls storage of a plurality of simulated difference data sets having a corresponding simulated difference data set for each simulated I/O command of the plurality of simulated I/O commands in the pool volume, each simulated difference data set including the storage area of the primary volume targeted by the corresponding simulated I/O command and the respective data acquired from the targeted storage area.

2. The storage system according to claim 1, wherein
the controller comprises a channel adapter receiving the plurality of write commands, a cache memory storing the plurality of data of the plurality of write commands transferred from the channel adapter, and a disk adapter sending the plurality of data of the plurality of write commands received from the cache memory to the plurality of disk drives.

3. The storage system according to claim 1, wherein
the controller generates the plurality of simulated I/O commands upon receiving a command for storing a new snapshot backup of the primary volume to the pool volume sent from a host computer.

4. The storage system according to claim 1, wherein
the controller manages a plurality of snapshot backup generations of the primary volume stored to the pool volume and a relationship between one of the plurality of snapshot backup generations and the plurality of simulated difference data sets.

5. The storage system according to claim 1, wherein
the controller manages a writing order of each of the plurality of difference data sets in the pool volume.

6. A data management method of a storage system, the storage system comprising a controller and a plurality of disk drives, the controller receiving a plurality of write commands each including respective data of a plurality of data targeted to a corresponding storage area of a plurality of storage areas of a primary volume and controlling storage of the plurality of data of the plurality of write commands to the corresponding storage areas of the primary volume targeted by the plurality of write commands, the plurality of disk drives being managed by the controller according to a Redundant Array of Independent/Inexpensive Disks (RAID) system and providing the primary volume and a pool volume, the pool volume storing backup data of the primary volume and providing a secondary volume as a virtual volume mapping the backup data, the data management method comprising:

managing the primary volume, the secondary volume, the pool volume and a difference bitmap, the pool volume storing a plurality of difference data sets having a corresponding difference data set for each write command of the plurality of write commands, each difference data set including the storage area of the primary volume targeted by the corresponding write command and respective data acquired from the targeted storage area prior to storage of the respective data of the corresponding write command to the targeted storage area, the difference bitmap indicating whether respective data from each of the plurality of storage areas of the primary volume has been stored to the pool volume since completion of a most recent prior backup of the primary volume to the pool volume generating a plurality of simulated I/O commands each targeting a corresponding storage area of the plurality storage areas of the primary volume from which, according to the difference bitmap, the respective data has not been stored to the pool volume since completion of the most recent prior backup of the primary volume to the pool volume, acquiring the respective data from each corresponding storage area of the plurality of storage areas targeted by the plurality of simulated I/O commands, and controlling storage of a plurality of simulated difference data sets having a corresponding simulated difference data set for each simulated I/O command of the plurality of simulated I/O commands in the pool volume, each simulated difference data set including the storage area of the primary volume targeted by the corresponding simulated I/O command and the respective data acquired from the targeted storage area.

7. The data management method according to claim 6, wherein
the controller comprises a channel adapter receiving the plurality of write commands, a cache memory storing the plurality of data of the plurality of write commands transferred from the channel adapter, and a disk adapter sending the plurality of data of the plurality of write commands received from the cache memory to the plurality of disk drives.

8. The data management method according to claim 6, wherein
the generating step for generating the plurality of simulated I/O commands upon receiving a command for storing a new snapshot backup of the primary volume to the pool volume sent from a host computer.

9. The data management method according to claim 6, further comprising:
managing a plurality of snapshot backup generations of the primary volume stored to the pool volume and a relationship between one of the plurality of snapshot backup generations and the plurality of simulated difference data sets.

10. The data management method according to claim 6, wherein
managing a writing order of each of the plurality of difference data sets in the pool volume.

11. A computer program stored in a computer readable storage medium and implemented in a storage system, the storage system comprising a controller and a plurality of disk drives, the controller receiving a plurality of write commands each including respective data of a plurality of data targeted to a corresponding storage area of a plurality of storage areas of a primary volume and controlling storage of the plurality of data of the plurality of write commands to the corresponding storage areas of the primary volume targeted by the plurality of write commands, the plurality of disk drives being managed by the controller according to a Redundant Array of Independent/Inexpensive Disks (RAID) system and providing the primary volume and a pool volume, the pool volume storing backup data of the primary volume and providing a secondary volume as a virtual volume mapping the backup data, the computer program comprising:

code for managing the primary volume, the secondary volume, the pool volume and a difference bitmap, the pool volume storing a plurality of difference data sets having a corresponding difference data set for each write command of the plurality of write commands, each difference data set including the storage area of the primary volume targeted by the corresponding write command and respective data acquired from the targeted storage area prior to storage of the respective data of the corresponding write command to the targeted storage area, the difference bitmap indicating whether respective data from each of the plurality of storage areas of the primary volume has been stored to the pool volume since completion of a most recent prior backup of the primary volume to the pool volume code for generating a plurality of simulated I/O commands each targeting a corresponding storage area of the plurality storage areas of the primary volume from which, according to the difference bitmap, the respective data has not been stored to the pool volume since completion of the most recent prior backup of the primary volume to the pool volume, code for acquiring the respective data from each corresponding storage area of the plurality of storage areas targeted by the plurality of simulated I/O commands, and code for controlling storage of a plurality of simulated difference data sets having a corresponding simulated difference data set for each simulated I/O command of the plurality of simulated I/O commands in the pool volume, each simulated difference data set including the storage area of the primary volume targeted by the corresponding simulated I/O command and the respective data acquired from the targeted storage area.

12. The computer program according to claim 11, wherein the controller comprises a channel adapter receiving the plurality of write commands, a cache memory storing the plurality of data of the plurality of write commands transferred from the channel adapter, and a disk adapter sending the plurality of data of the plurality of write commands received from the cache memory to the plurality of disk drives.

13. The computer program according to claim 11, wherein the generating code for generating the plurality of simulated I/O commands upon receiving a command for storing a new snapshot backup of the primary volume to the pool volume sent from a host computer.

14. The computer program according to claim 11, further comprising:

code for managing a plurality of snapshot backup generations of the primary volume stored to the pool volume and a relationship between one of the plurality of snapshot backup generations and the plurality of simulated difference data sets.

15. The computer program according to claim 11, wherein code for managing a writing order of each of the plurality of difference data sets in the pool volume.

* * * * *